United States Patent
Neufeld et al.

(10) Patent No.: US 8,356,288 B2
(45) Date of Patent: Jan. 15, 2013

(54) METHOD AND APPARATUS FOR MONITORING RUNTIME OF PERSISTENCE APPLICATIONS

(75) Inventors: Andrea Neufeld, Limburgerhof (DE); Robin de Silva Jayasinghe, Nussloch (DE); Dietmar Theobald, Karlsruhe (DE)

(73) Assignee: SAP AG, Walldorf (DE)

( * ) Notice: Subject to any disclaimer, the term of this patent is extended or adjusted under 35 U.S.C. 154(b) by 1028 days.

(21) Appl. No.: 12/267,828

(22) Filed: Nov. 10, 2008

(65) Prior Publication Data

US 2010/0122239 A1 May 13, 2010

(51) Int. Cl.
*G06F 9/44* (2006.01)
*G06F 9/45* (2006.01)

(52) U.S. Cl. .................. 717/131; 717/127; 717/128
(58) Field of Classification Search .......... 717/124–132; 709/203–204
See application file for complete search history.

(56) References Cited

U.S. PATENT DOCUMENTS

| | | | | |
|---|---|---|---|---|
| 6,173,440 B1* | 1/2001 | Darty | | 717/130 |
| 6,681,383 B1* | 1/2004 | Pastor et al. | | 717/126 |
| 6,862,711 B1* | 3/2005 | Bahrs et al. | | 715/205 |
| 6,871,341 B1* | 3/2005 | Shyr | | 717/131 |
| 6,944,643 B1* | 9/2005 | Ahmad et al. | | 709/203 |
| 7,043,460 B2* | 5/2006 | Deboer et al. | | 706/10 |
| 7,146,603 B2* | 12/2006 | Kerpan et al. | | 717/120 |
| 7,382,371 B1* | 6/2008 | Ciabarra | | 345/440 |
| 7,395,526 B2* | 7/2008 | Arcand | | 717/127 |
| 7,519,952 B2* | 4/2009 | Bordawekar et al. | | 717/124 |
| 7,536,290 B1* | 5/2009 | Browning et al. | | 703/21 |
| 7,644,395 B1* | 1/2010 | Frey et al. | | 717/128 |
| 7,716,274 B1* | 5/2010 | Kumar | | 709/203 |
| 7,752,604 B2* | 7/2010 | Genkin et al. | | 717/125 |
| 7,757,216 B2* | 7/2010 | Maron | | 717/127 |
| 7,809,536 B1* | 10/2010 | Browning et al. | | 703/6 |
| 7,877,735 B2* | 1/2011 | Todorova et al. | | 717/131 |
| 7,882,492 B2* | 2/2011 | Viswanadha et al. | | 717/124 |
| 7,900,186 B2* | 3/2011 | Lucassen et al. | | 717/104 |
| 7,941,789 B2* | 5/2011 | Ivanov et al. | | 717/128 |
| 7,979,850 B2* | 7/2011 | Ivanov et al. | | 717/128 |
| 8,037,457 B2* | 10/2011 | Stefanov | | 717/128 |
| 8,037,458 B2* | 10/2011 | Shekov | | 717/128 |

OTHER PUBLICATIONS

Lai et al, "An efficient data mining framework on hadoop using Java persistence API", IEEE, pp. 203-209, 2010.*
Balos et al, "Software tool construction for deployment of JMX services in distributed testbeds", IEEE, pp. 1-11, 2006.*
Lu et al, "A JMX toolkit for merging network management systems", ACM pp. 1-10, 2006.*
Thies et al, "RefaFlex: Safer refectorings for reflective Java progarms", ACM ISSTA, pp. 1-11, 2012.*

* cited by examiner

*Primary Examiner* — Anil Khatri
(74) *Attorney, Agent, or Firm* — Schwegman Lundberg Woessner P.A.

(57) ABSTRACT

A monitoring method and apparatus monitors a runtime application to collect and display static and dynamic data concerning software entities and database operations in a runtime environment. In one embodiment, monitoring classes are used to collect monitoring data from at least one PersistenceUnit (PU) and at least one PersistenceContext (PC) associated with the PU of an application the uses an in implementation of a Java Persistence Application Programming Interface (JPA). A Java Management Extension (JMX) MBean communicates with the monitoring classes to expose monitoring data outside the runtime environment.

14 Claims, 23 Drawing Sheets

METHOD AND APPARATUS FOR MONITORING RUNTIME OF PERSISTENCE APPLICATIONS

TECHNICAL FIELD

This invention relates generally to the field of computer systems, and more particularly to the monitoring of executing software applications.

BACKGROUND

The administration and management of software systems is an ever-increasing challenge as the solutions grow ever more numerous and complex. At the same time, organizations have grown increasingly dependent on enterprise applications and their continuous and uninterrupted operation. It is not uncommon for such applications to perform well under certain load or conditions of use, but to degrade in performance under other conditions of use. The ability to monitor application performance in real time can be very helpful to personnel responsible for administering and maintaining such applications, as well as developers and others involved in the development and configuration of the applications.

SUMMARY

According to one example embodiment, there are provided monitoring systems and methods for monitoring a runtime application and to collect, process and display both static and dynamic data concerning the runtime application. In another embodiment, a user interface provides navigation to display monitoring information including or derived from the monitoring data, the monitoring information including information concerning software entities and database operations associated with those entities. In another embodiment, quality assessments may be made based on comparing the observed behavior of a runtime application versus the expected behavior.

BRIEF DESCRIPTION OF THE DRAWINGS

FIGS. 17-23 illustrate example user interfaces according to embodiment of the inventive subject matter.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Figure 1:
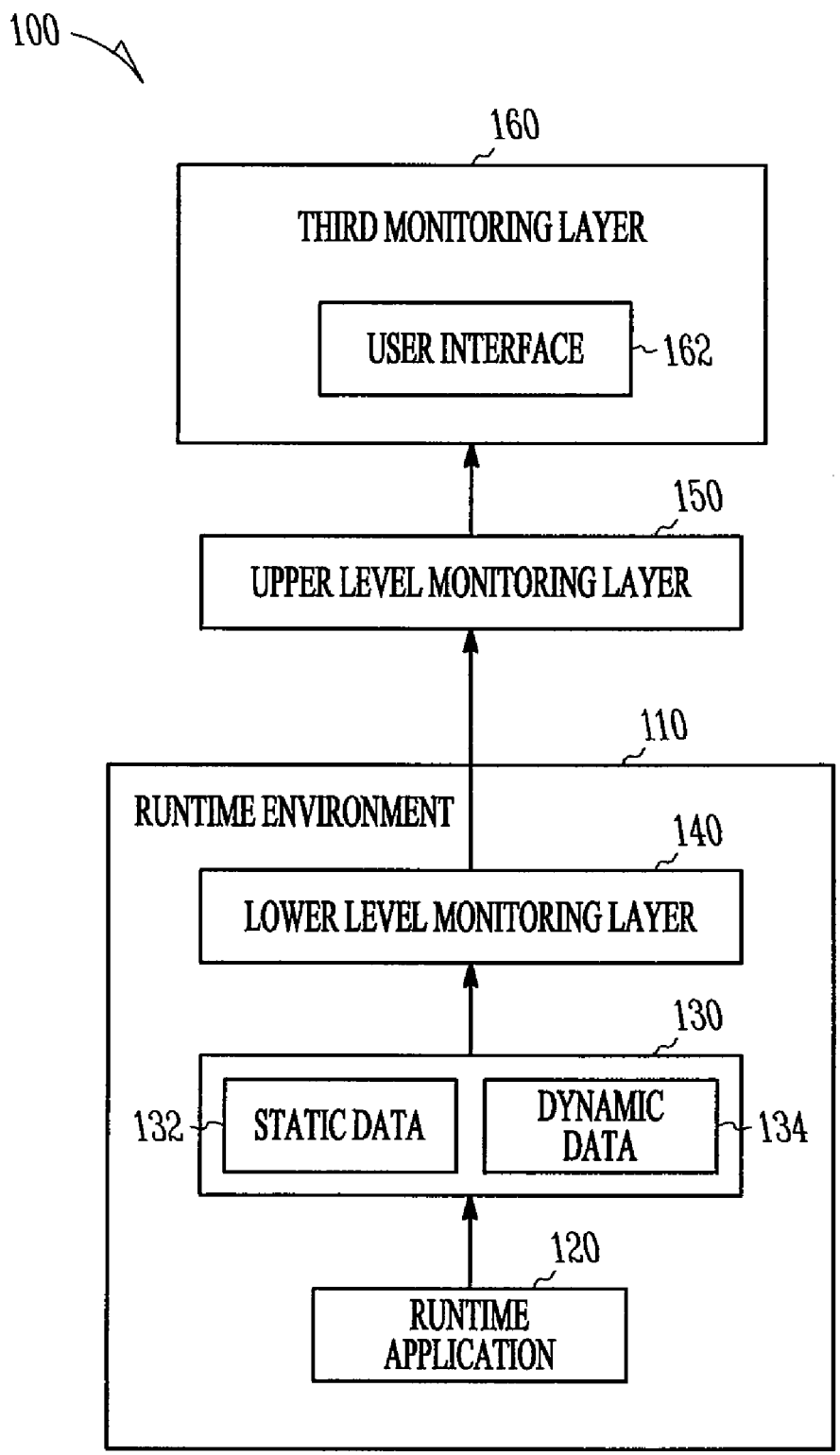
FIG. 1 illustrates a high level block diagram according to one embodiment of the inventive subject matter.

Referring now to FIG. 1, there is illustrated a high level block diagram of an example embodiment of a monitoring infrastructure 100 using an application runtime environment 110, in which one more applications 120 may be executed. According to one example, the monitoring infrastructure 100, runtime environment 110, and application 120 are implemented using the JAVA® Platform. In an example, runtime environment 110 conforms to the Java Runtime Environment and application 120 is written according to specifications of the Java Programming Language. According to one embodiment, infrastructure 100 may use Java Management Extensions (JMX®) technology to provide the tools for building distributed, Web-based, modular and dynamic solutions for managing and monitoring devices, applications, and service-driven networks. JMX resources are represented by objects called MBeans (for Managed Bean).

The monitoring system includes a lower level monitoring layer 140 to gather relevant monitoring data 130 and provide it to an upper level monitoring layer 150, wherein upper layer 150 is external to environment 110. Layers 140 and 150 are, in one embodiment, a user interface (UI) independent monitoring infrastructure. A third monitoring layer 160 may include at least one UI 162 interfacing with layer 150 to enable the user to work with the monitoring data 130. As explained in more detail below, monitoring data 130 may include both static data 132 and dynamic data 134 associated with application(s) executing in environment 110. Static data 132 may include, for example, data concerning the structure, attributes or entities of the applications, while dynamic data 134 may include data relating to operations performed by the applications 120, such as database operations. In one example embodiment, the UI 162 of monitoring infrastructure 100 is integrated with an existing monitoring and management infrastructure of a further software system.

Figure 2A:
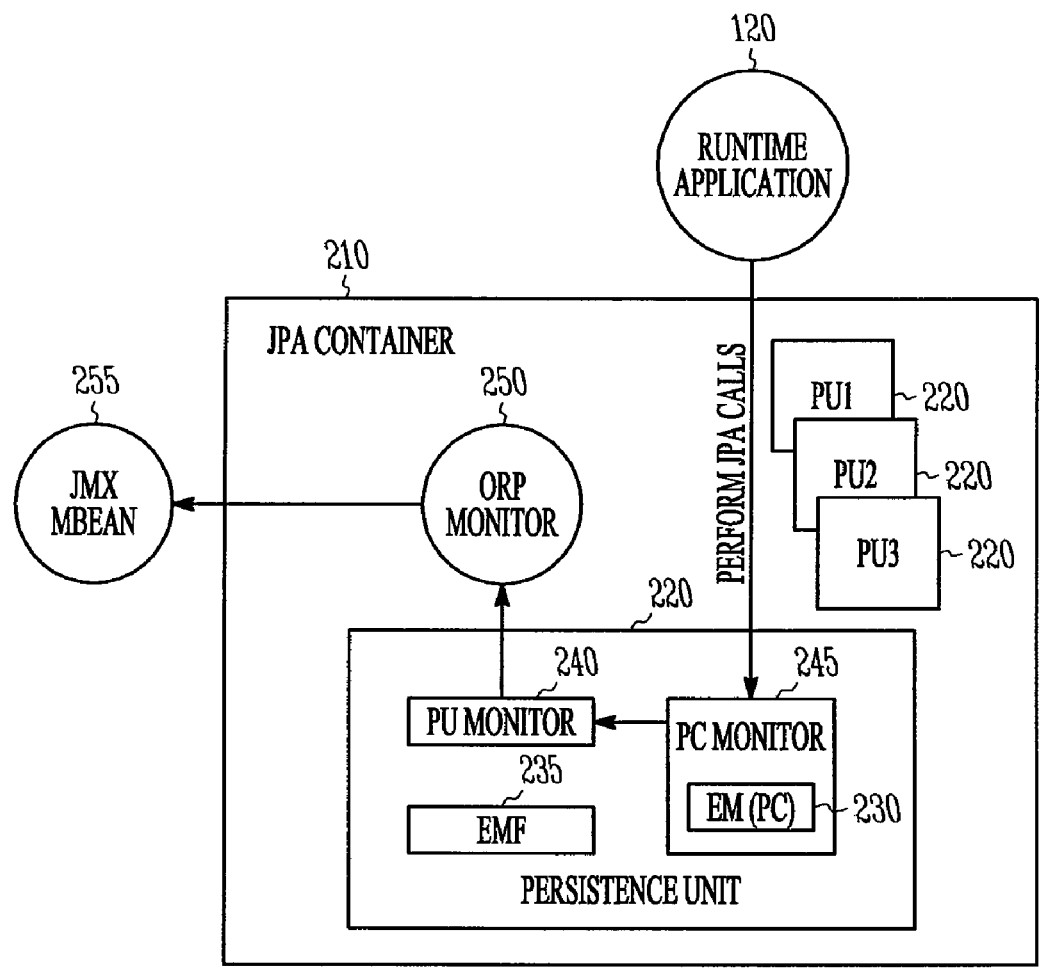
FIGS. 2A and 2B illustrate runtime diagrams according to embodiments of the inventive subject matter.

As illustrated in the example embodiment of FIG. 2A, the runtime application 120 interfaces with a Java Persistence Application Programming Interface (JPA) implementation deployed in a JPA Container 210 including a Java PersistenceUnit (PU) 220 and a PersistenceContext (PC) 230 operating therein. In general, a Java PU can be a software object that provides functionality for defining a persistence provider, a data source to use, and object-relational mapping information. A Java PC can be one or more software objects that are managed by a manger software object to perform a designated function. However, Java PUs and PCs are only exemplary, and other PUs and PCs may be used from other persistence frameworks. Accordingly, in this embodiment, in the lowest layer 140 of infrastructure 100 relevant monitoring data is gathered in response to actions from the PU 220 and the PC 230 operating within a EntityManagerFactory (EMF) 235. In this example, lower layer 140 is comprised of monitoring classes 240 and 245 termed PU monitor and PC monitor, respectively, to collect data from the PU 220 and PC 230, including static metadata located in the EMF 235.

All the data for all deployed and running JPA applications may be collected at a central point in a further monitoring class 250, named the ORPersistenceMonitor (ORP) in FIG. 2A, and this central point may be exposed as one or more JMX MBeans 255, deployed in layer 150 of FIG. 1 that is outside the runtime environment 110. In one embodiment, the MBean 255 forms a thin interface between the JPA-integrated monitoring implementation of layers 140 and 160. According to another example embodiment, the monitor classes 240 and 250 are integrated into the JPA runtime environment 110 to minimize the influence on the implementation's classes.

Accordingly, in one example embodiment, the central access-point for the JPA monitoring may be a monitoring class 250 that exposes the monitoring data through various interfaces such as UI 162, for example by passing through a JMX MBean 255 as shown in FIG. 2A. The data structures of ORP 250 are filled with data out of the runtime application 120 and make it accessible to components outside of the runtime environment. In order to be accessible from outside the interfaces, in one embodiment the monitors 250 are part of the API of the JPA implementation.

Figure 2B:
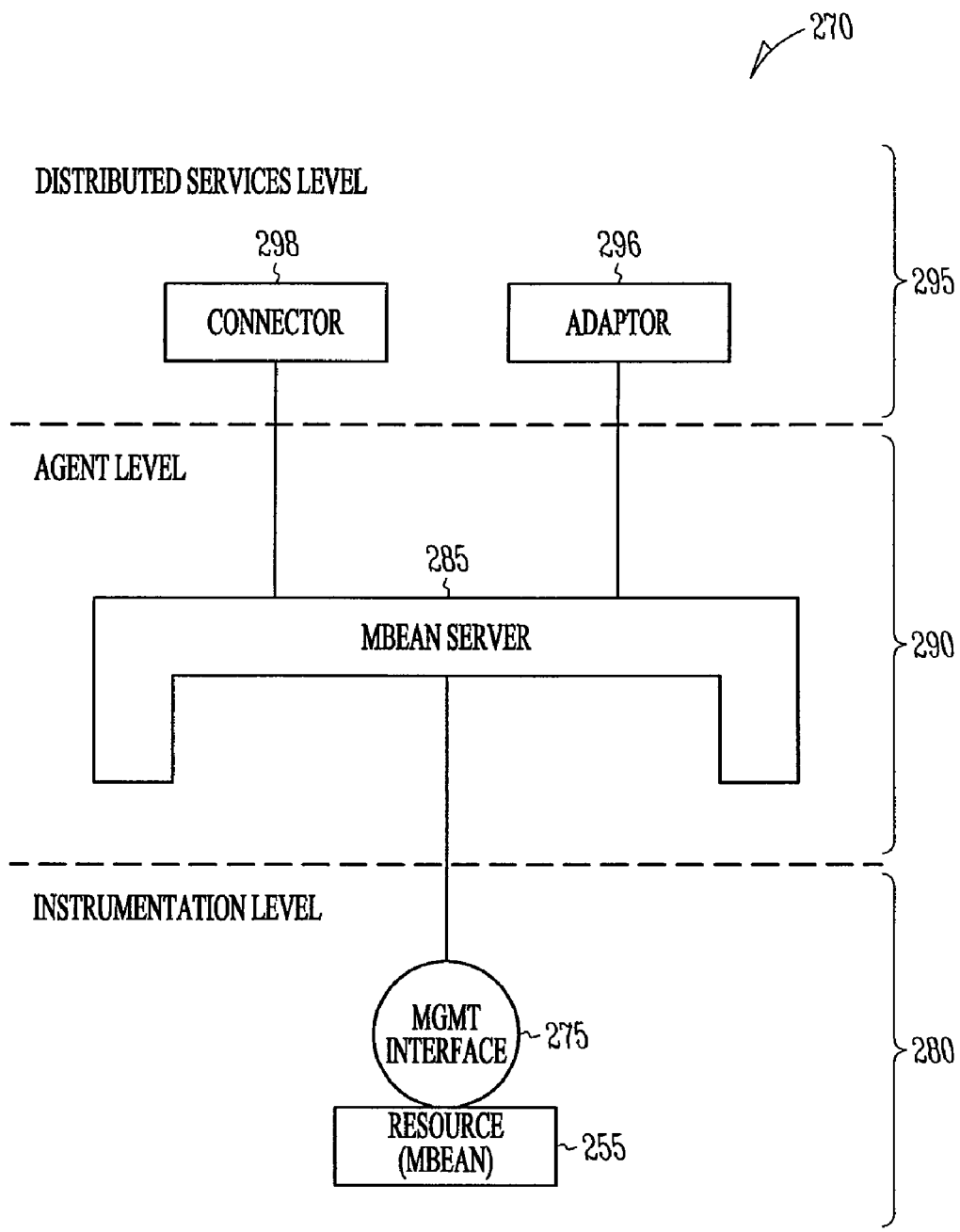

In another example embodiment illustrated in FIG. 2B, the JMX MBean 255 is deployed in a JMX infrastructure 270 that enables arbitrary Java resources to be managed in a standard way. The resources can provide a management interface 275 at the instrumentation level 280 and register the MBean object that implements it in the local MBean Server 285 at the agent level 290. At the distributed services level 295 the infrastructure provides adaptors 296 and connectors 298 to connect to the MBean Server 285. A user of the JMX infrastructure 270 can work with distributed MBean servers 285 transparently, i.e., from the user's perspective there is only one MBean server 285 that contains all the registered MBeans 255. In one example embodiment, one or more MBeans 255 are implemented to access the underlying monitors 250 and provide the management interface for retrieving the actual monitoring data about the JPA runtime.

Figure 3:
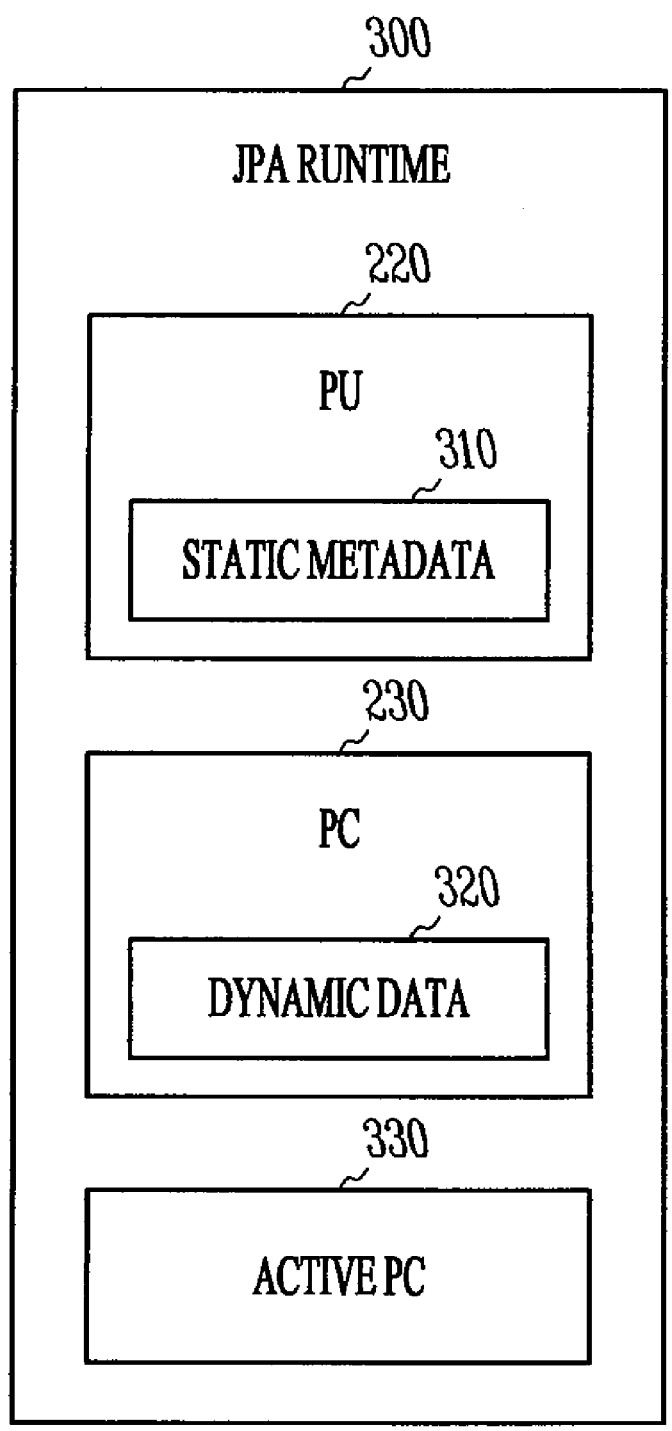
FIG. 3 illustrates a monitoring infrastructure diagram according to an embodiment of the inventive subject matter.

As indicated above and as further illustrated in FIG. 3, the monitoring infrastructure collects data of at least two different types from the JPA runtime 300. The first is static metadata 310 about a given JPA application. This data is stored in the PU 220 that is provided to the JPA runtime 300 at application startup and will not change until the next application startup or deployment. The second part is the volatile, dynamic data 320 that represents an application's state regarding its object persistence. According to one example embodiment, JPA state is held in the PC 230. The PC 230 has only a short lifetime relative to a PU 220 that maximally endures as long as a transaction does. In an example embodiment, a transaction is a JTA transaction that is bound to the application's request. Accordingly, it is considered difficult to display the current state of a PC directly in a monitoring user interface.

Additionally, in one example embodiment, there is a data structure 330 called active PCs. Active PCs are those that are still bound to a JPA client and contain managed JPA entity objects. PCs 230 that are visible in this data structure have an extended lifetime. In most cases, this means that the PCs are kept in a stateful session bean (SFSB) and have thus have an extended lifecycle that spans over multiple requests to the SFSB. Another reason a PC may have an extended lifetime is that the calling JPA client code has semantic errors and somehow circumvents the lifecycle management of a Java Enterprise Edition (EE) server. Hanging transactions can also be a cause. However, such PCs 230 are kept in that structure and their data is added to the accumulated monitoring data as soon as they reach the end of their lifecycle.

Figure 4:
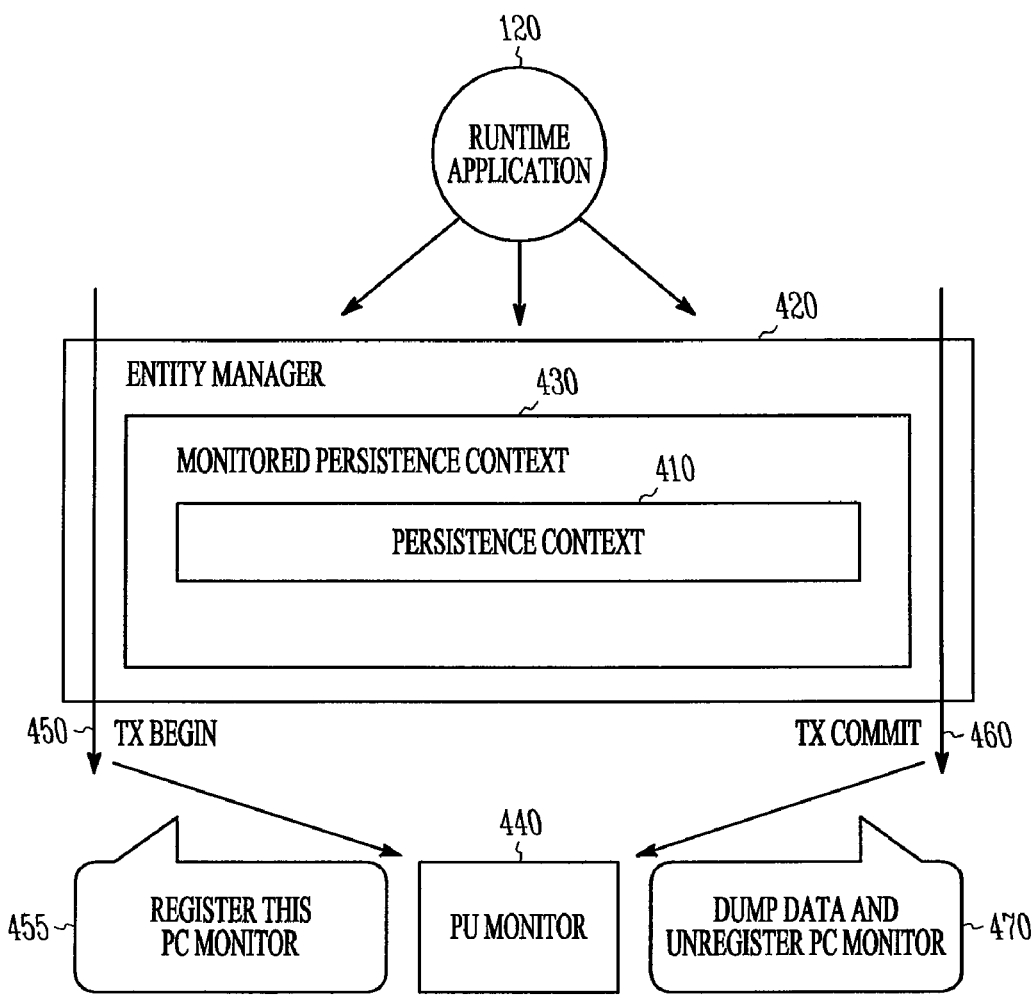
FIG. 4 illustrates the lifecycle of a monitored PersistentContext according to one embodiment of the inventive subject matter.

FIG. 4 illustrates an example embodiment displaying the lifecycle of a monitored EntityManager 420 (e.g., an EntityManager in a JPA implementation) interfacing with runtime application 120. At the highest layer there is an EntityManager 420. Then, at the monitoring layer there is a PersistenceContext monitor 430 for a PC 410, and a PersistenceUnit monitor 440. When the transaction (TX) begins at 450, the PC monitor 430 is registered 455 with the PU monitor 440. Then, when the transaction commits at 460, the data in the PC 410 is dumped and the PC monitor is unregistered 470 with the PU monitor.

Figure 5:
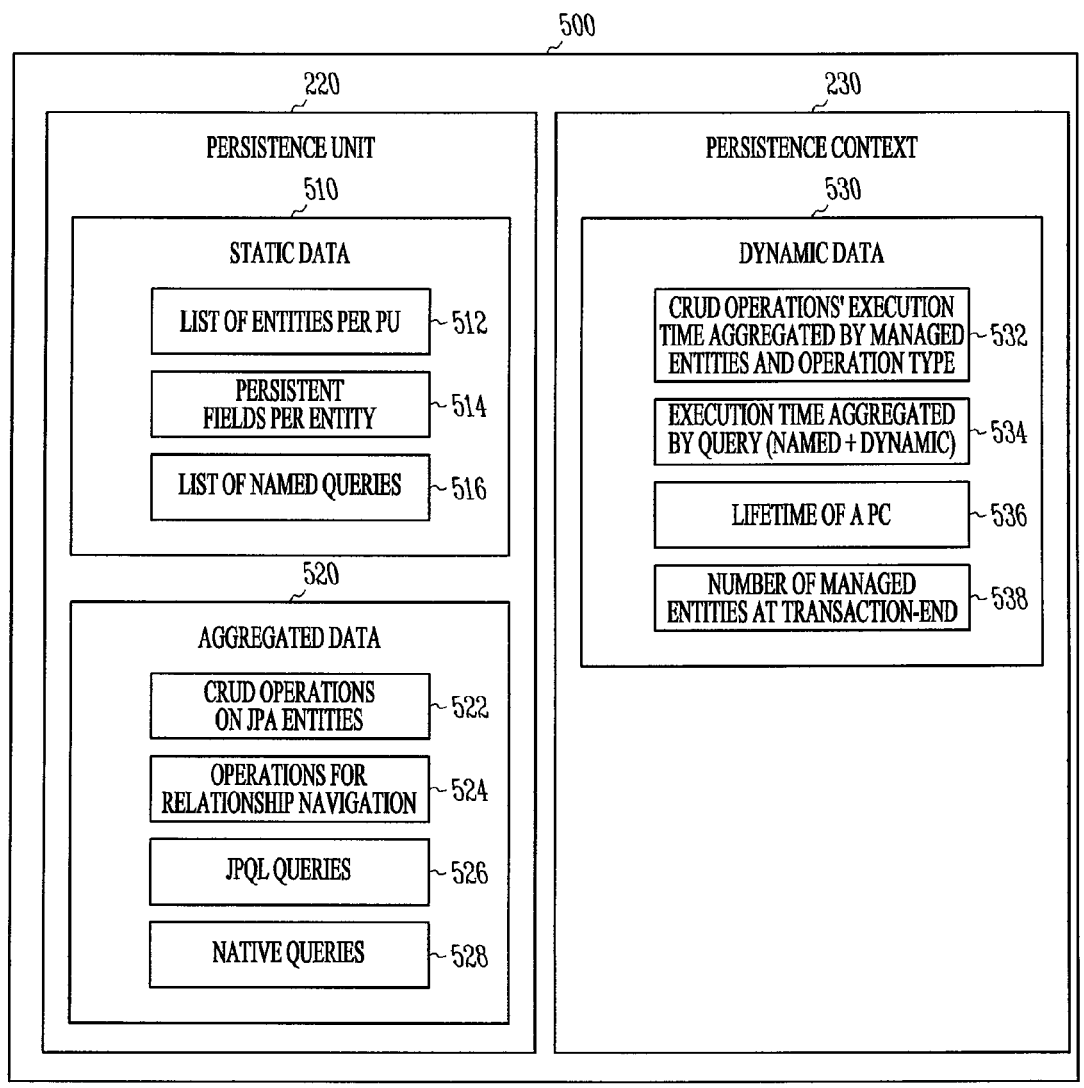
FIGS. 5-11 illustrate data structure diagrams according to embodiments of the inventive subject matter.

In a further embodiment, as illustrated in the data structure diagram 500 of FIG. 5, the static data 510 for a PU 220 is computed once in an application's lifecycle and includes a list of entities 512 per PU 220, the persistent fields 514 per entity, and a list of named queries 516. Further, the aggregated data 520 collected for database operations can include create, read, update and delete (CRUD) operations 522 on JPA entities, operations for relationship navigation 524, Java Persistence Query Language (JPQL) queries 526 and native queries 528. For a given PC 230, collected for the lifecycle of the PC 230, the different type of dynamic data 530 collected during runtime of an application can include CRUD operations' execution time aggregated by managed entities and operation type 532, execution time aggregated by query (named+dynamic) 534, lifetime of a PC 536, and the number of managed entities at transaction-end 538. In one embodiment, a monitor stores the collected data in an internal data structure of a Java class. According to one example embodiment, the size of the PU 220 is measured once at the creation of the EMF 235. All relevant sizes of the PU 220 can be acquired via the PU 220 itself. Thus, the monitor 240 can be provided with only a reference to the PU 220. The information needed for monitoring the PU 220 can then be retrieved by the monitor 240.

Figure 6:
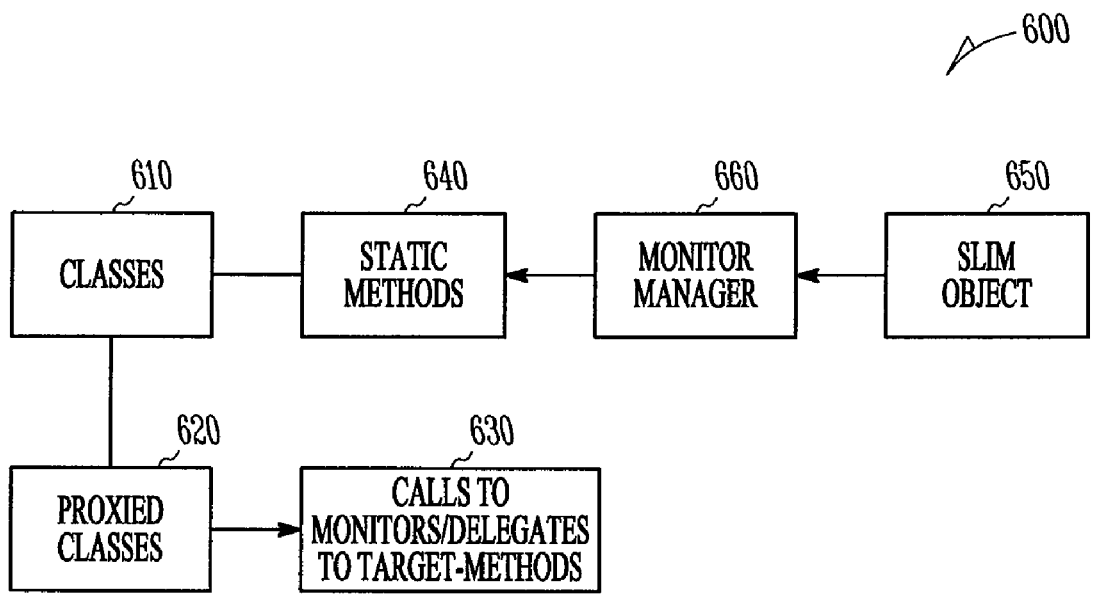

According to one example embodiment, the monitoring implementation of infrastructure 100 is designed to minimize the influence on an existing JPA implementation that the infrastructure is deployed to monitor. According to one approach 600 to minimize the influence, as illustrated in FIG. 6, the classes 610 that are monitored are accompanied by proxied classes 620 (proxied versions of the classes 610). The proxied classes 620 execute the calls 630 to the monitors and delegate to the target-methods. In the case that a target class does not implement an interface to the monitors, an interface may be declared that contains at least all methods that are relevant for the monitor-calls.

For static methods 640 the proxy-approach based on interfaces may not be applicable. However, according to one example embodiment, the actions that are taken in such classes are monitored according to one or more other approaches. One example approach is to use a slim object 650 that is handed over to each static method 640 via an interface that offers simple methods to start and stop monitoring database operations. As shown in FIG. 6, this interface is represented as MonitorManager 660. According to one example embodiment, if the monitoring is turned off, this interface is implemented by a dummy implementation that does nothing but call "return." In another example embodiment, if the monitoring is turned on, the MonitorManager 660 implementation uses a DatabaseStatistics object of the Open SQL for Java runtime to monitor the database operations. Using this approach, in one example embodiment, classes with static methods may be monitored with almost no overhead when the monitoring is turned off.

Figure 7:
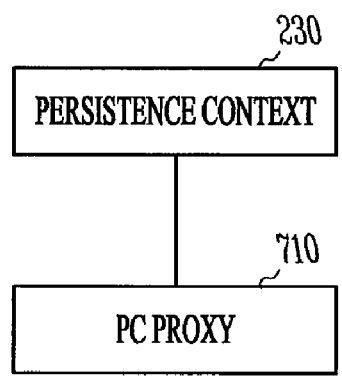

According to another example embodiment illustrated in FIG. 7, two additional classes are used to implement the monitoring for the PC 230 accompanied with the previously described mechanisms. First, the PC 230 is proxied with a PC Proxy 710 to allow it to measure lifetime of the PC 230 as well as the number of managed entities. The PC Proxy 710 has the same lifecycle as the PC 230 itself. Second, all relevant method signatures of a StoreManager class (e.g., a StoreManager as in a JPA implementation) can be extended with an argument of type MonitorManager. The implementation of the StoreManager methods can be extended with calls that start and stop the MonitorManager within the relevant methods.

Figure 8:
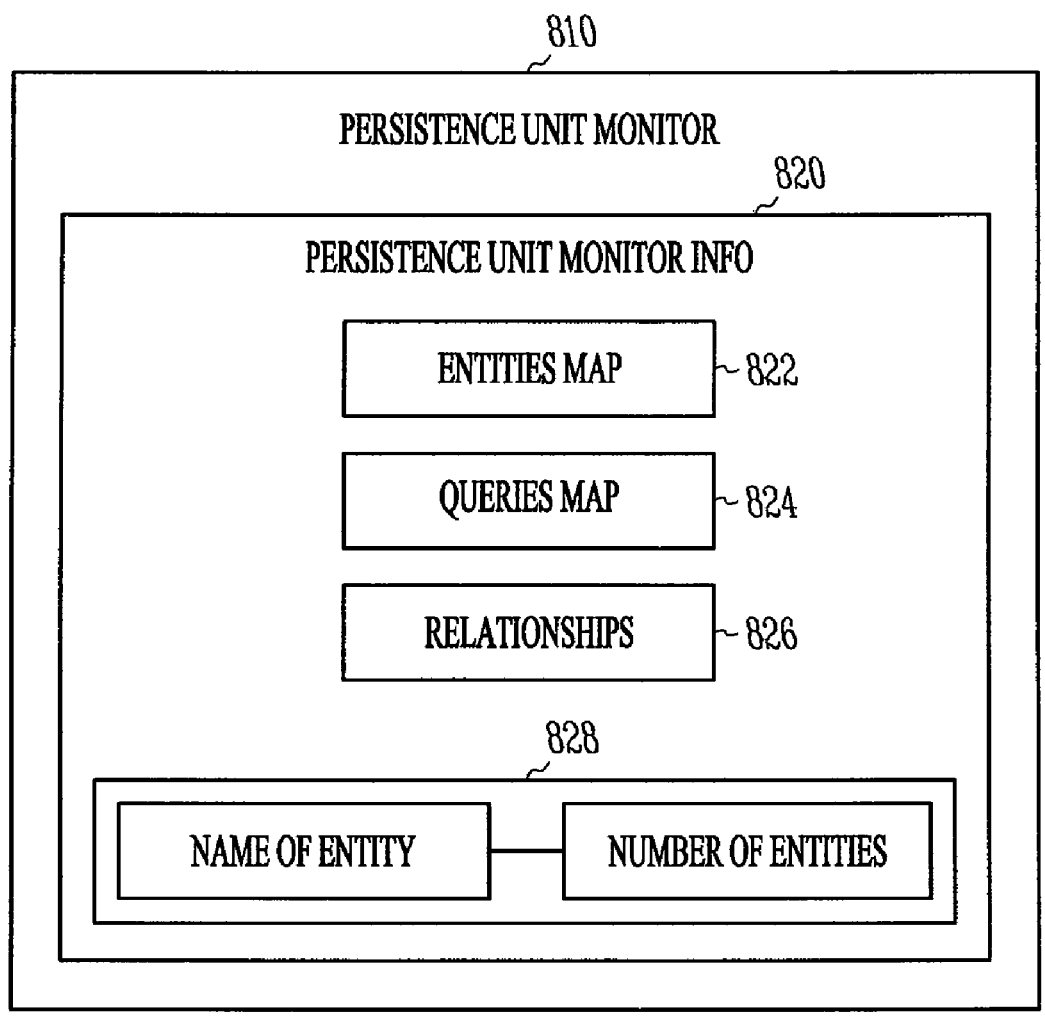

Referring now to FIG. 8, an example embodiment, the monitoring classes and associated data structures are described in more detail. In FIG. 8, the monitoring class 240 for a given JPA PU 220 is shown as a PUMonitor 810. In one embodiment, it contains a data structure for static information about the PU 220 that is called PUMonitorInfo 820. Aggregated data about database operations triggered by JPA operations are stored in three maps inside the PUMonitor 810. The entities map 822 can hold aggregated data for CRUD operations triggered by operations on JPA entities. Next a queries map 824 can hold aggregated data for JPQL and SQL queries. Lastly, a relationships map 826 can hold aggregated data for relationship-navigation between JPA entities.

In another example embodiment, since the PUMonitorInfo 820 counts properties of a referenced PU 220, the monitor contains a map 828 that has the names of the entities as keys and the number of the entities' fields as values. As may be understood, the overhead of monitoring the PU 220 will grow with the size of the PU 220. The values for the PUMonitor 810 will only be computed once at the creation of the EMF 235, for example at the first injection of an EntityManager into the client application. According to one example embodiment of monitoring a JPA application, only aggregated values for PCs 220 are needed. In this embodiment only one data structure per JPA application is used. The PUMonitor 810 can store average values for the values that are supplied from the respective proxied PCs 230.

Figure 9:
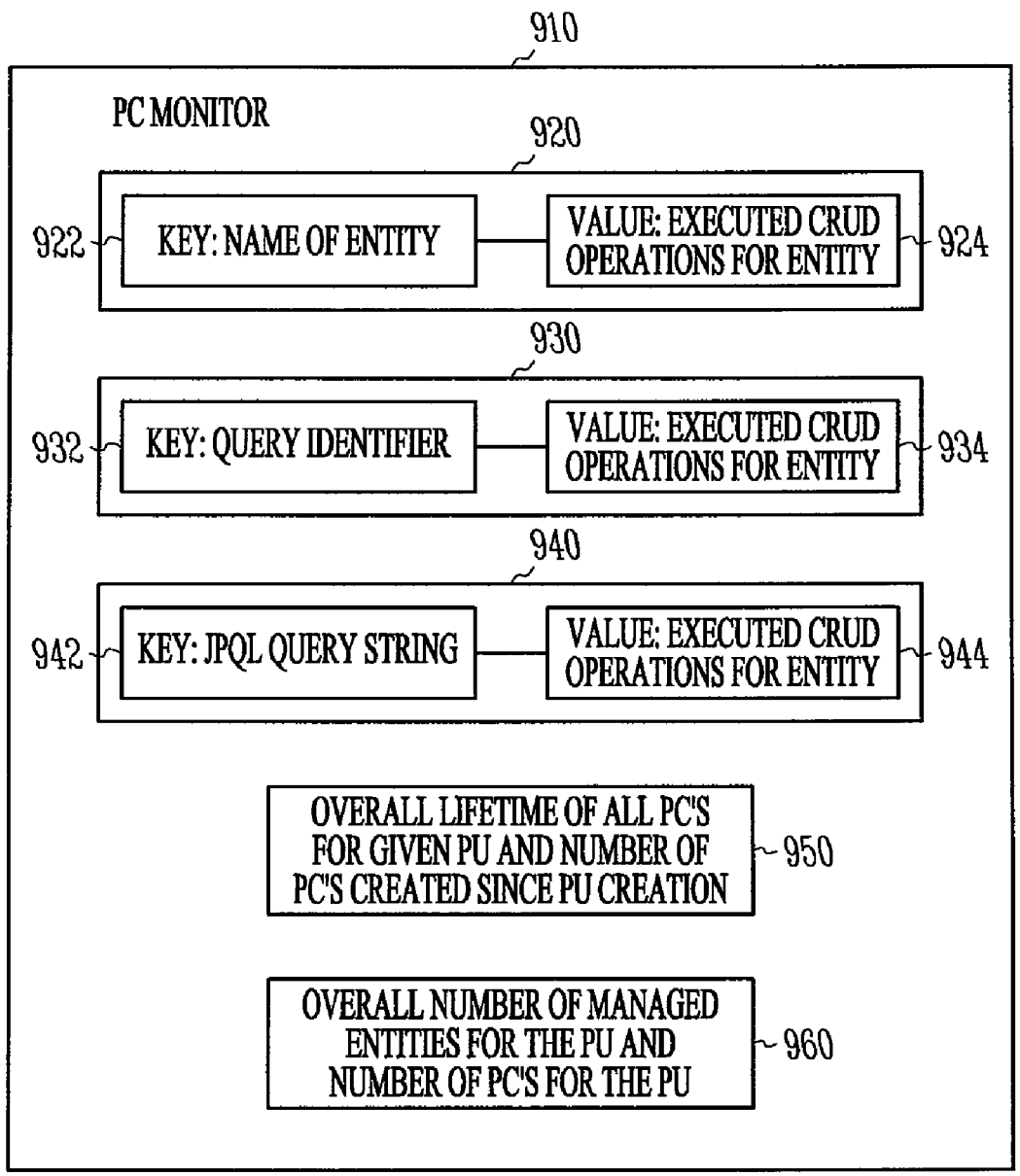

Referring to FIG. 9, an example embodiment, the monitoring class 240 for a given JPA PC 230 is shown as a PCMonitor 910. In one example embodiment, the PCMonitor 910 contains several data structures. A first map 920 holds the average execution time of CRUD statements per entity. A map key 922 provides the name of the entity. A map value 924 specifies a Java class that holds a map with all CRUD operations that have been executed for the given entity, with the map values grouped by the CRUD operation type. Each item of the map contains the type of the operation, the database time, the number of database operations, and the number of operations on the entity. A second map 930 holds all named and dynamic queries and their average execution time. A map key 932 contains a QueryIdentifier 934 which contains the SQL statement String and the type of the query, which can be one of the following: DYNAMIC, DYNAMIC_NATIVE, NAMED, NAMED_NATIVE. A map value 934 specifies a Java class that holds the overall execution time and the number of executions of the respective entity. A third map 940 holds all relationships between JPA entities and the average execution-time of the according database operations. A map key 942 specifies the JPQL query string. A map value 944 specifies a Java class that holds the overall execution time and the number of executions of the respective entity. The PCMonitor 910 further includes a field 950 that holds the overall lifetime of all PCs 230 for the given PU 220 and the number of all PCs 230 that have been created for the given PU 220 since its creation.

PCMonitor 910 further includes a field 960 that holds the overall number of managed entities for the given PU as well as the number of all created PCs for the PU.

Figure 10:
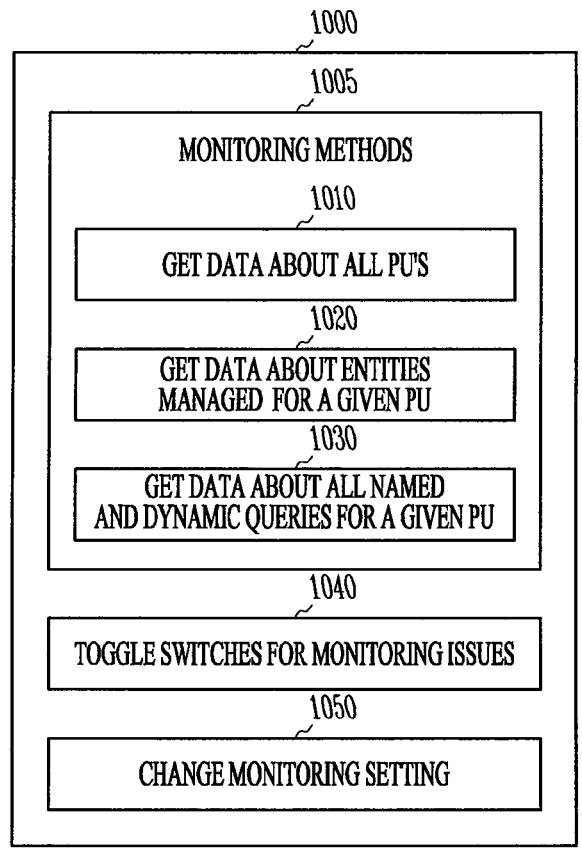

As indicated in FIG. 2, in at least one example embodiment, JMX MBeans 255 can provide access to all monitoring data and to all administration and configuration functions which are necessary to operate the JPA monitoring in the runtime environment 110. Hence, the JMX MBeans 255 can call the appropriate monitors and provide according methods. The MBeans 255 can provide multiple methods 1000 as illustrated in FIG. 10. For example, monitoring methods 1005 can get data 1010 about all PUs 220 including data about the number and lifetime of all PCs 230 created within a PU 220, get data 1020 about all entities managed within a given PU 220, and get data 1030 about all named and dynamic queries for a given PU 220. Also, in an embodiment, administrative methods 1040 can toggle the switches for monitoring issues, especially methods for switching on/off the JPA monitoring or for toggling only the time measurement. Lastly, configuration methods 1050 can change monitoring settings like number of entities or queries to be monitored. In one embodiment, if the monitoring is switched off, there is preferably not any measurable influence on the runtime application's resource consumption (time & memory).

According to still another example embodiment, an MBean 255 supports a UI-independent monitoring infrastructure allowing multiple different clients to use the MBean. Thus, in one example embodiment, the MBeans 255 do not imply resource-specific classes. In an example embodiment, a resource is a piece of data that can be accessed by the code of an application. A resource-specific class may be a class that implements data types beyond those that have been predefined. Therefore, all clients may be able to use the MBean as long it has been configured to use the predefined data types. Thus, this may be relevant for those methods that require returning not only one item of a simple Java type but a set of items or fields representing the current status of a resource. MBeans of Complex data types are, in one embodiment, addressed by using a JMX Open Type, a predefined data type, instead of resource-specific classes. For example, the Java type of a complex return value could be CompositeData that could be described in an Open Type.

Figure 11:
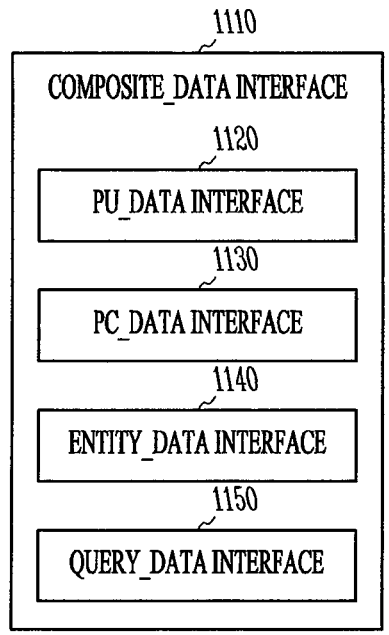
Figure 12A:
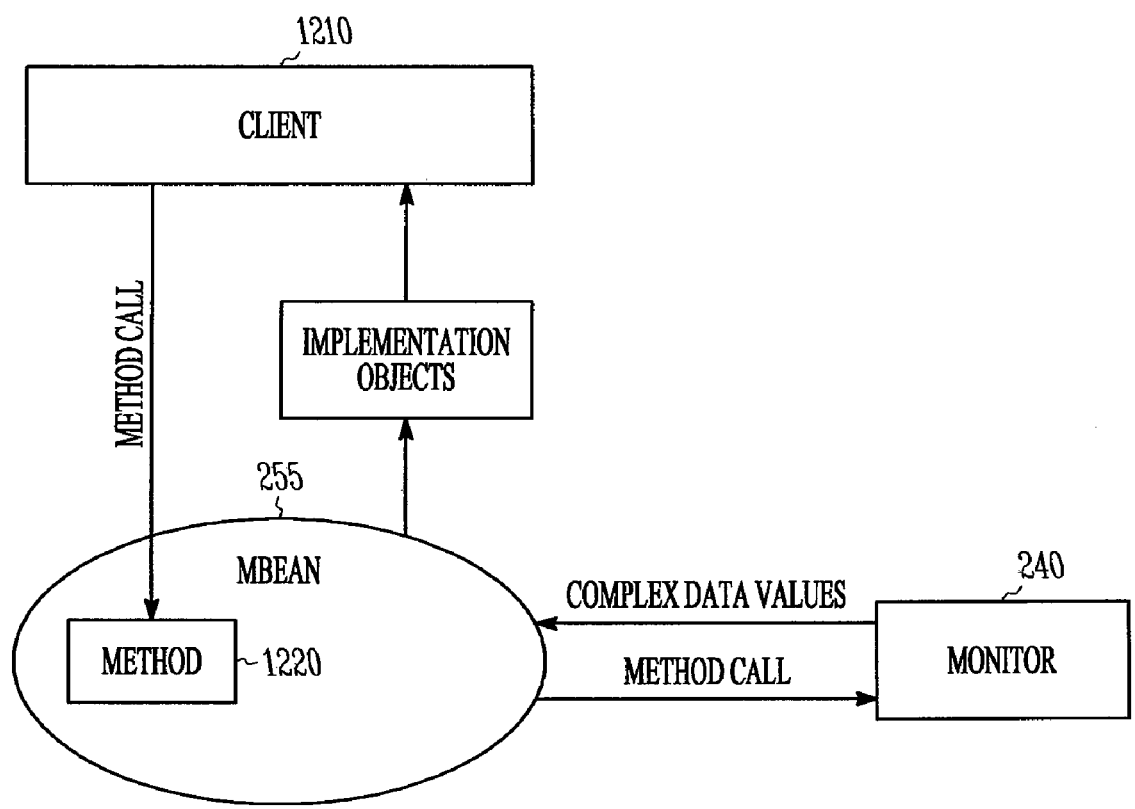
FIG. 12A illustrates a method call according to an embodiment of the inventive subject matter.

As illustrated in FIG. 11, in one embodiment of an MBean 255 there are several complex return values realized as interfaces extending a CompositeData interface 1110, including a PUData interface 1120, a PCData interface 1130, an EntityData interface 1140 and a QueryData interface 1150. The PUData interface 1120 provides setters and getters for PU data like application and data source name and total number of created PCs, and the like. The PCData interface 1130 that provides setters and getters for PC data like start time of the PC. The EntityData interface 1140 provides setters and getters for entity data like total number of CRUDs. The QueryData interface 1150 provides setters and getters for (named or dynamic) query data like total number of executions. In one example embodiment illustrated in FIG. 12A, when a client 1210 calls a method 1220 of a JPA MBean 255, the corresponding method of the underlying monitor 240 is called. If the monitor 240 returns complex data values, the MBean 255 creates appropriate implementation objects of the above mentioned interfaces and returns them to the client 1210. Any client 1210 can access the data by means of the composite type descriptors that are provided by the CompositeData interface 1110.

Figure 12B:
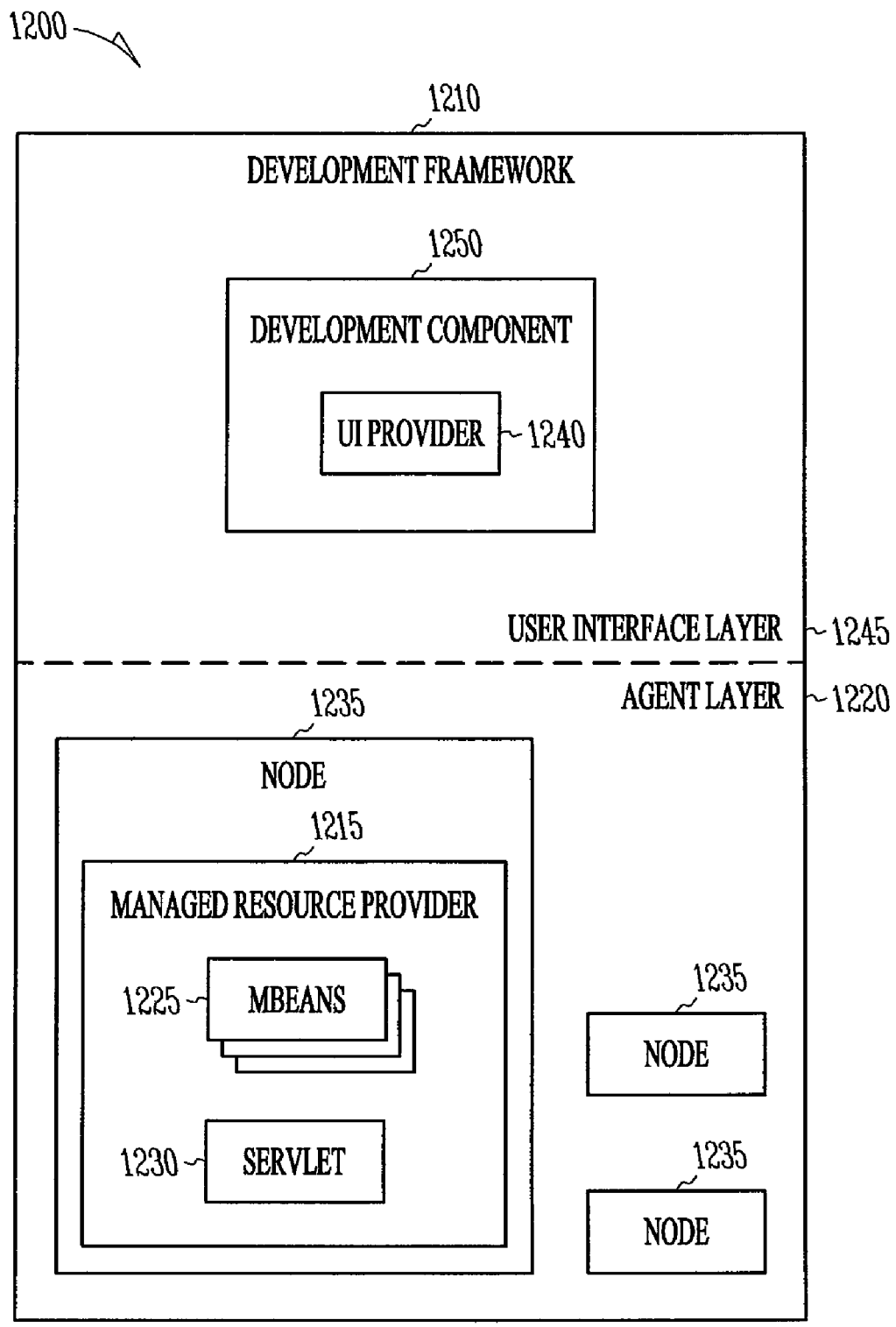
FIG. 12B illustrates a development framework according to an embodiment of the inventive subject matter.

In still another example embodiment 1200 illustrated in FIG. 12B, the JPA monitoring infrastructure 100 is integrated into a development framework 1210 as a managed resource provider 1215. Within an agent layer 1220 of the framework, the JPA monitoring integrates in the form of MBeans 1225. These MBeans 1225 are registered on every cluster node 1235 in the framework when starting the JPA container 210, allowing monitoring of those nodes. The JPA monitoring infrastructure 100 may also be integrated as a UI provider 1240 to a UI layer 1245 of framework 1210 by implementing a plug-in in a development component (DC) 1250. The DC 1250 may be created within a software component (SC) that defines a deliverable, deployable unit. In case of JPA Monitoring, one DC representing the monitoring of the persistence units is sufficient.

According to one embodiment, the development framework 1210 follows the MVC (Model View Controller) paradigm that is based on a clear separation of the functions of data model (model), presentation logic (view), and program control (controller). In an embodiment, there is a JMX Model Importer, an Integrated Development Environment (IDE) plug-in that can extract information about the framework 1210 model classes out of the set of compiled management interfaces of the implemented MBeans, and generates two types of data. First, it generates model classes for each imported MBean and for each composite data that is used as attribute, parameter or return type in the MBean interfaces. Second, it generates MBean proxies that make direct calls to the corresponding MBeans transparent. Thus, the resulting JMX model of the JPA Monitoring can, for example, include classes like PUData or EntityData that contain the necessary monitoring data. The model allows the direct binding of UI elements like component and view contexts to the model classes.

Figure 13:
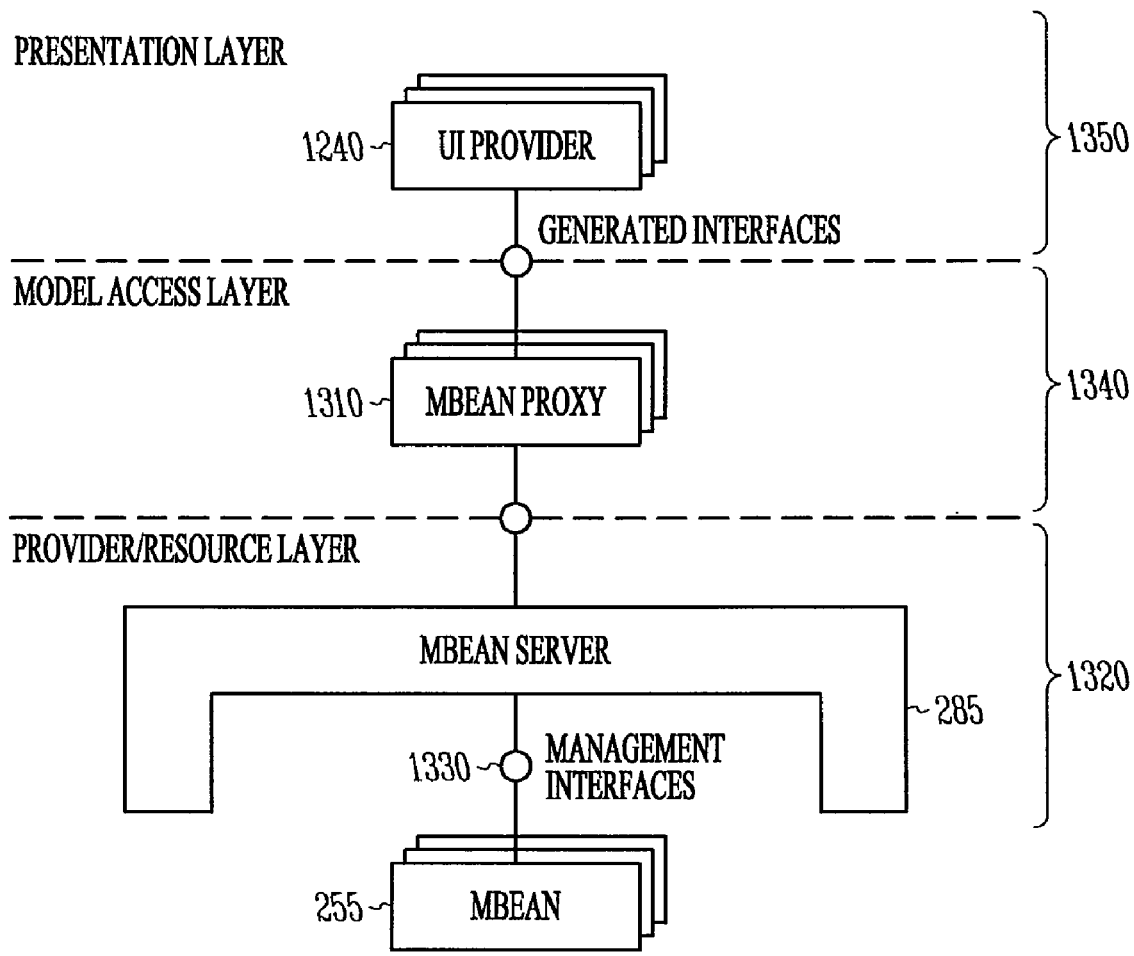
FIG. 13 illustrates the role of MBean proxies according to an embodiment of the inventive subject matter.

FIG. 13 shows an example role of MBean proxies such as MBean proxy 1310. As illustrated, the Provider/Resource Layer 1320 includes MBean 255. Coupled to MBean 255 is MBean Server 285. Located in between MBean 255 and MBean Server 285 is a management interface 1330. In an embodiment, MBean proxy 1310 is included in the Model Access Layer 1340. The Model Access Layer 1340 is located in between the Provider/Resource Layer 1320 and the Presentation Layer 1350. The Presentation Layer 1350 includes UI Provider 1240. In one embodiment, UI Provider 1240 is coupled to MBean Proxy 1310.

In one embodiment, the JPA Monitoring plug-in needs a JMX connection to the selected system to perform monitoring operations, i.e., call methods of the registered MBeans. The plug-in gets a JMX connection by registering the selected system properties at the connection registry that is provided by the framework 1210.

Figure 14:
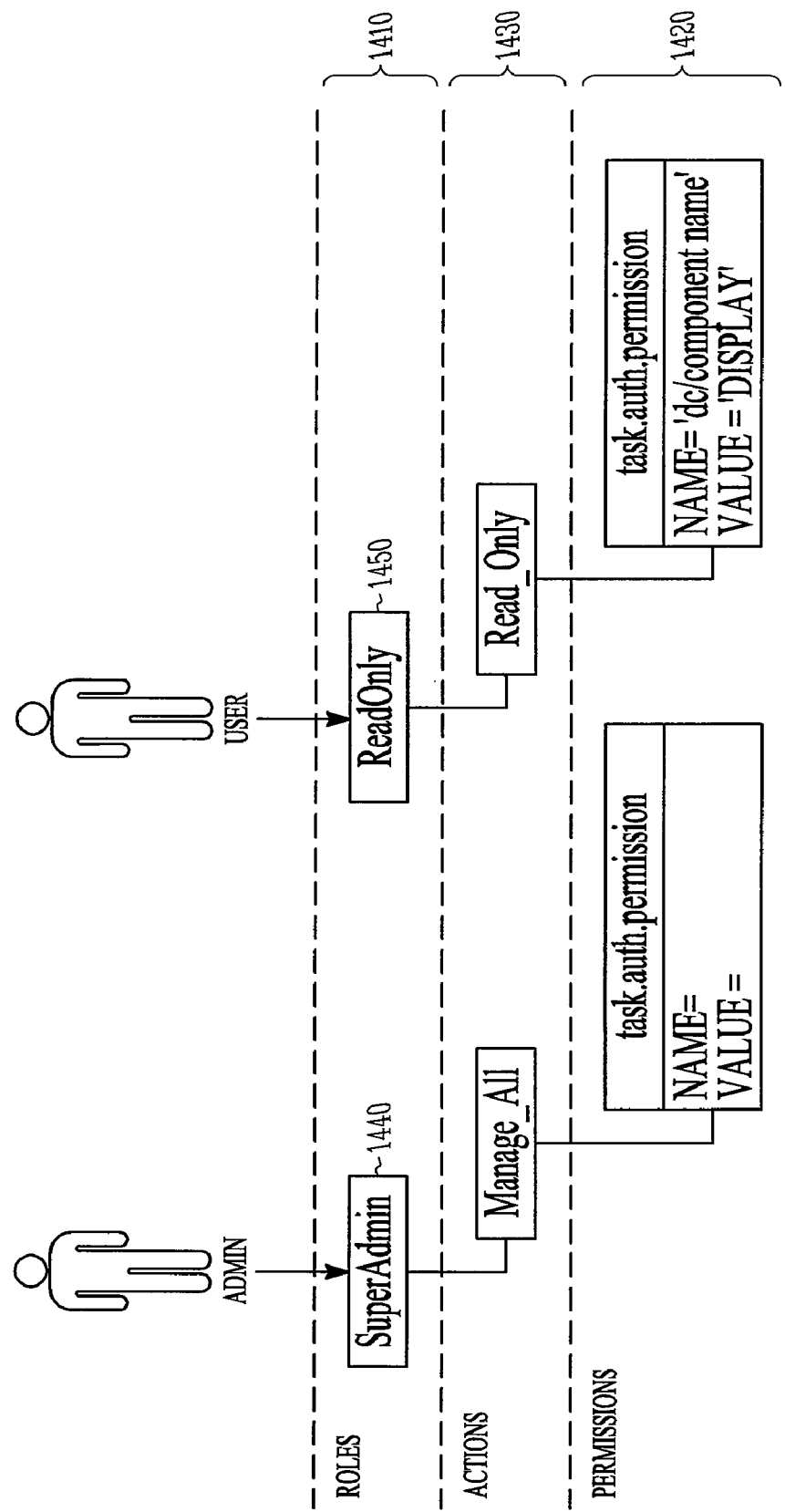
FIG. 14 illustrates an implementation of UI level access according to an embodiment of the inventive subject matter.

In a further example embodiment, a multistate approach to UI level access is implemented. An example is illustrated in FIG. 14. The framework supports security roles 1410 in order to allow the customer to restrict the access to administrative tasks to certain users, for example using permission objects 1420 for granting access to certain actions 1430 in the UI as well as to the APIs in the JMX model. According to one embodiment, there are two predefined roles: SuperAdmin 1440 and Read-Only 1450.

In another example embodiment, the UI framework provides a display or read-only action for each plug-in. For any configuration or administrative task, JPA Monitoring can perform checks on application-specific (e.g., change) permissions based on which UI elements are enabled or disabled. For example, switching off/on a time measurement within JPA Monitoring should only be possible for a user who has change permission. In an example embodiment, if the user has only the read permission, the corresponding button in the UI will be disabled.

Figure 15:
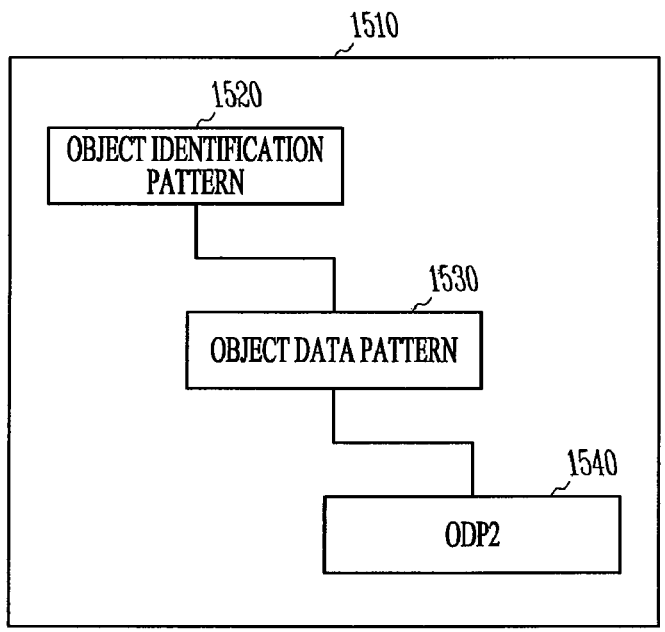
FIGS. 15-16 illustrate data structure diagrams according to embodiments of the inventive subject matter.

According to still another example embodiment illustrated in FIG. 15, the UI uses a hierarchical approach 1510 of displaying a defined set of objects and its related information in two main patterns 1520 and 1530. The first is the Object Identification Pattern (OIP) 1520, in which a collection of defined objects is displayed in a standard table or table/tree view. The second is the Object Data Pattern (ODP) 1530, which contains detailed information of the selected OIP object. If needed, an ODP2 1540 is shown to display the details of an ODP.

Figure 16:
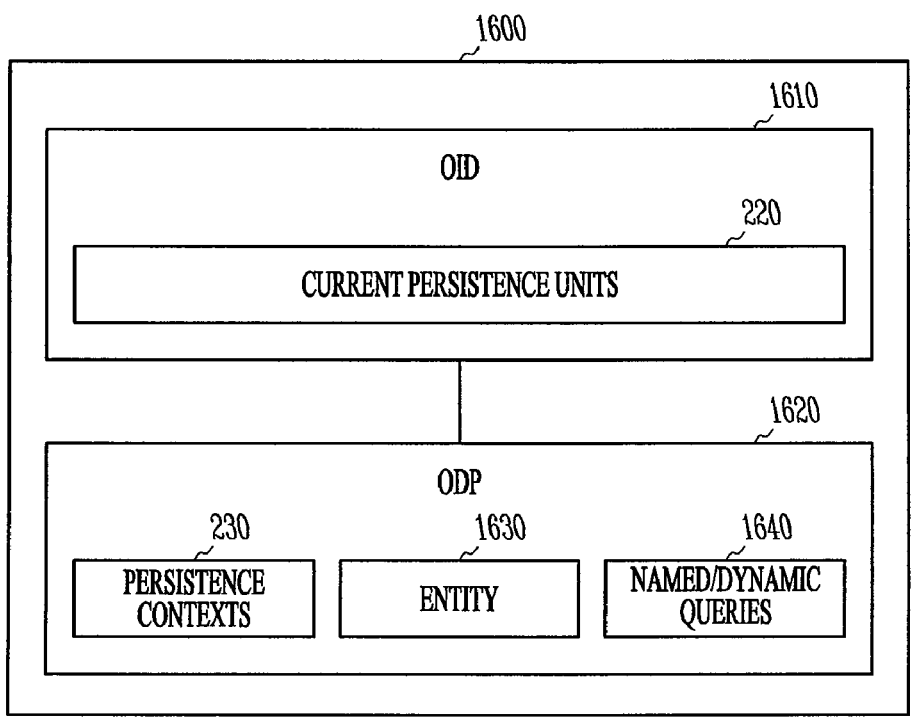

For the JPA Monitoring infrastructure 100 described herein, the monitoring objects may be displayed within a hierarchy 1600 such as that shown in FIG. 16, wherein an OID 1610 shows a view of Current PUs 220, including summary data about the number and lifetime of created PCs 230 and the average number of entities per PC 230. An ODP 1620 is illustrated as a tab strip including details about PCs 230 such as start time, number of managed entities and CRUDs; for each Entity 1630 the name, number of fields, number of CRUDs, and CRUD-time; for each Relationship 1650 the declaring and target entity, the declaring field, cardinality, number of (DB) operations and operation time; for each Named/Dynamic Query 1640 the text, SQL-text, number of executions, and execution time; and for each Cache 1660 the type, current and maximum size, number of hits and requests and hit ratio.

According to another example embodiment, for the infrastructure 100 described herein, the JPA implementation is used as the O/R (Object-relational) mapping technology in the Java Server provided in the Netweaver™ system commercially available from SAP. In this embodiment, the JPA Monitoring infrastructure is integrated into the NetWeaver™ Administrator (NWA). In still another embodiment, JPA Monitoring can also form a unified persistence view with the Open SQL Monitoring that is already integrated into NWA, meaning that is reachable by the same navigation as Open SQL Monitoring. In an example embodiment, Open SQL refers to an infrastructure which controls a set of statements that perform operations on a central database. Results of the operations and any accompanying error messages may be independent of the actual database system in use. Thus, Open SQL provides a platform independent set of statements that may operate on disparate database systems. In an example embodiment, Open SQL for Java is the application of Open SQL to a Java environment. In an example embodiment, Open SQL Monitoring refers to monitoring the execution of SQL statements when Open SQL for Java is used to access a database. As may be appreciated to one skilled in the art, other frameworks providing databases independent monitoring beyond Open SQL may be used.

In some embodiments, professional applications for NWA need to provide configuration data required to work within the NWA UI framework. The configuration data is stored in the Portal Content Directory (PCD). This data can include, but is not limited to, for example, name, title and description of the application and the components, a local/central mode, a place in the NWA navigation, or a customer service network (CSN) component. In an embodiment, the JPA Monitoring is available in local and central mode. The place in the NWA navigation is the same as for the Open SQL for Java Monitors (e.g., the monitors used for Open SQL Monitoring).

Accordingly, as described above, there is provided a monitoring infrastructure for monitoring JPA applications. According to one embodiment, since Java EE applications have a strict concept of visibility and packaging, a consumer of the persistence monitoring for JPA would not need to care about any visibility, class-loading issues or packaging limitations or issues. The monitoring infrastructure provides static data relating to monitoring JPA applications as well as the collection and display of dynamic runtime information (e.g., database time). It further provides an aggregated view over all cluster-nodes and for filtering and grouping for various key-attributes of running JPA applications in order to enhance supportability of various applications. Strong integration of the monitoring-capabilities into a JPA library is also provided.

Figure 17:
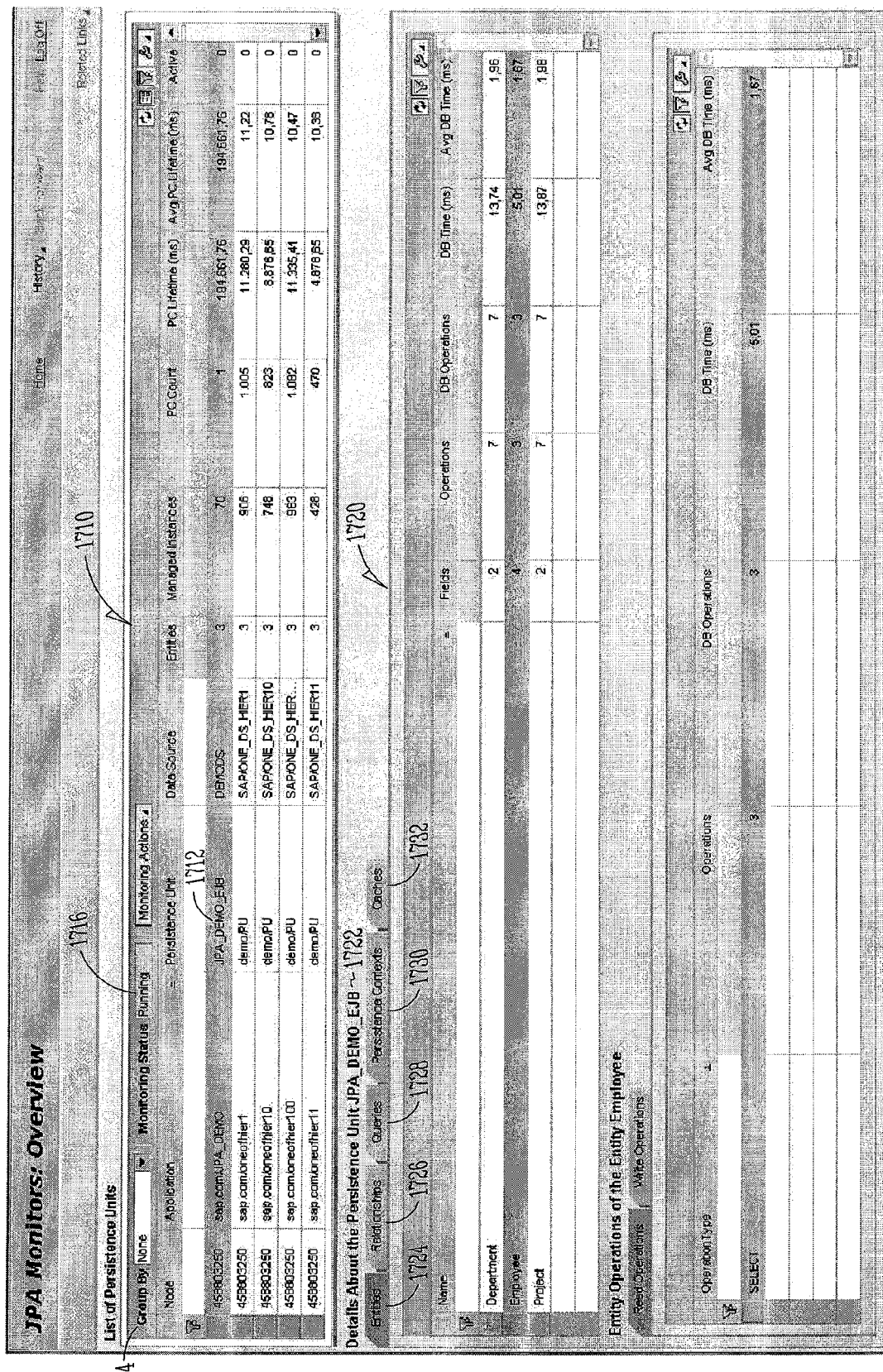

FIG. 17 illustrates an example overview user interface according to an example embodiment. As illustrated, there is a Persistence Units section 1710 that displays one or more Persistence Units 1712. The Persistence Units section 1710 has a user grouping control 1714 which allows a user to group the Persistence Units 1712 in differing manners. The grouping options can include, but are not limited to, grouping by application or cluster nodes. There is also a status box 1716 that displays whether or not the persistence providers on all nodes in a particular cluster of nodes are being monitored. In an embodiment, if the monitoring is turned on, all the PUs are monitored for that cluster. In an embodiment, the Persistence Units section 1710 further includes column headings which enable a user to sort the displayed list of Persistence Units 1712. For example, the sorting options can include, but are not limited to, one or a combination of "Node," "Application," "Persistence Unit," "Data Source," "Entities," "Managed Instances," "PC Count," "PC Lifetime," "Avg. PC Lifetime," and "Active Status." Also, in an embodiment, a Persistence Unit detail section 1720 displays more detailed information about a selected Persistence Unit 1722 from the Persistence Units section 1710. The detailed information can include, but is not limited to, entities 1724, relationships 1726, queries 1728, Persistence Context 1730, and caches 1732 associated with the selected Persistence Unit 1722.

Figure 18:
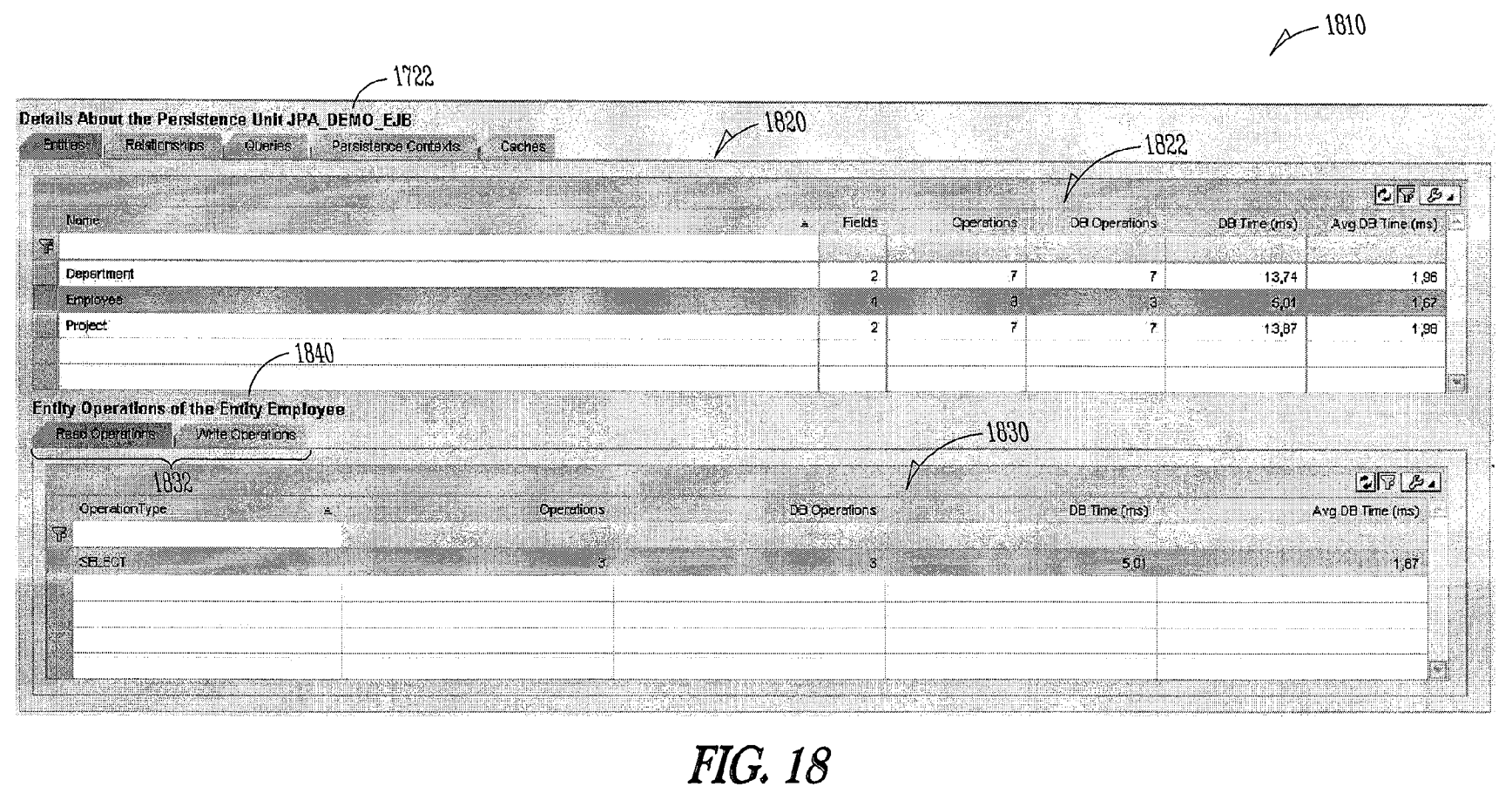

FIG. 18 illustrates an example user interface 1810 containing detailed information related to the entities of a selected Persistence Unit 1722. It can include an entity table 1820 that lists entities associated with the selected Persistence Unit 1722. The entities listed can be sorted according to certain criteria 1822, including, but not limited to, "Name," "Fields," "Operations," "DB Operations," "DB Time," and "Avg. DB Time." An additional entity operation table 1830 includes an operation listing 1832 that can include the entity read and write operations on a selected entity 1840 from the entity table 1820.

Figure 19:
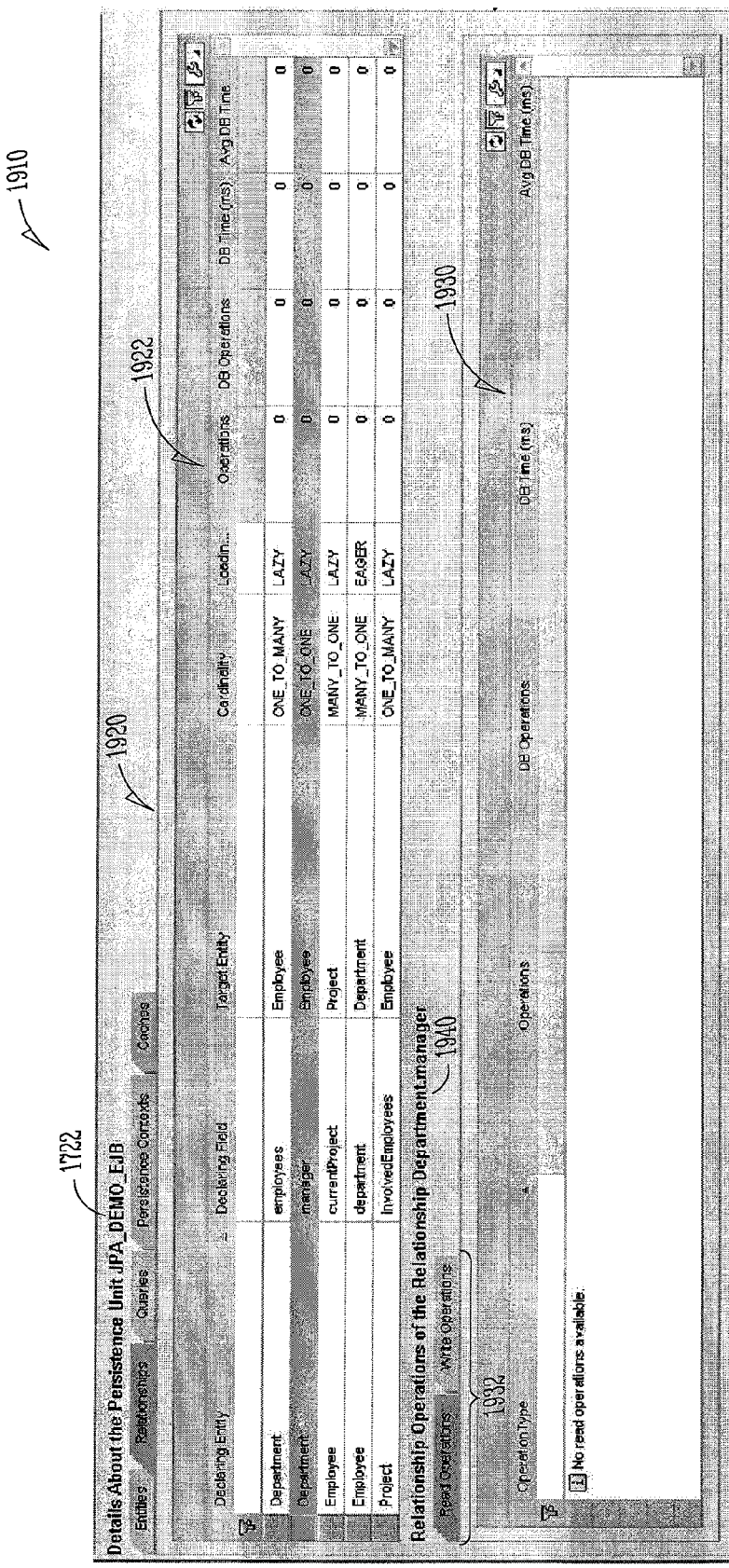

FIG. 19 illustrates an example user interface 1910 containing detailed information related to the relationships of a selected Persistence Unit 1722. It can include a relationship table 1920 that lists relationships associated with the selected Persistence Unit 1722. The relationships listed can be sorted according to certain criteria 1922, including, but not limited to, "Declaring Entity," "Declaring Field," "Target Entity," "Cardinality," "Operations," "DB Operations," "DB Time," and "Avg. DB time." An additional relationship operation table 1930 includes an operation listing 1932 that can include the relationship read and write operations on a selected relationship 1940 from the relationship table 1920.

Figure 20:
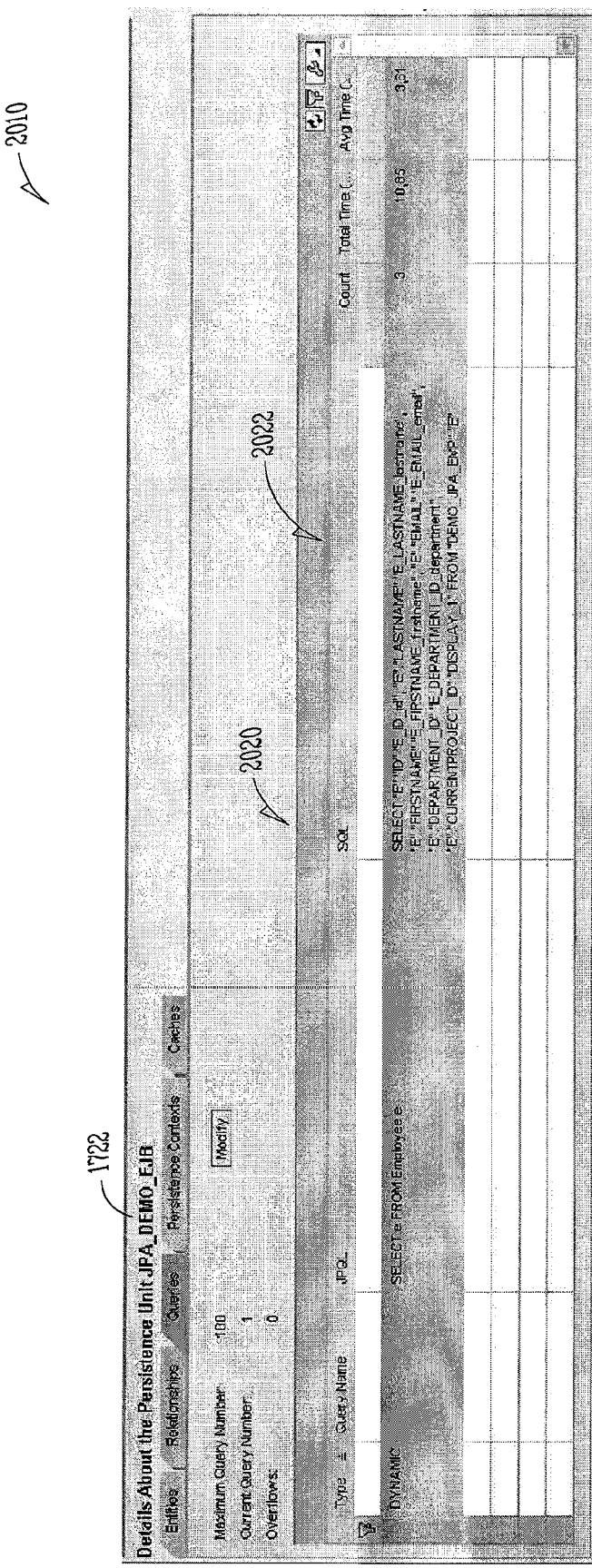

FIG. 20 illustrates an example user interface 2010 containing detailed information related to the Queries of a selected Persistence Unit 1722. It can include a query table 2020 that lists queries associated with the selected Persistence Unit 1722. The queries listed can be sorted according to certain criteria 2022, including, but not limited to, "Type," "Query Name," "JPQL," "SQL," "Count," "Total Time," and "Avg. Time."

Figure 21:
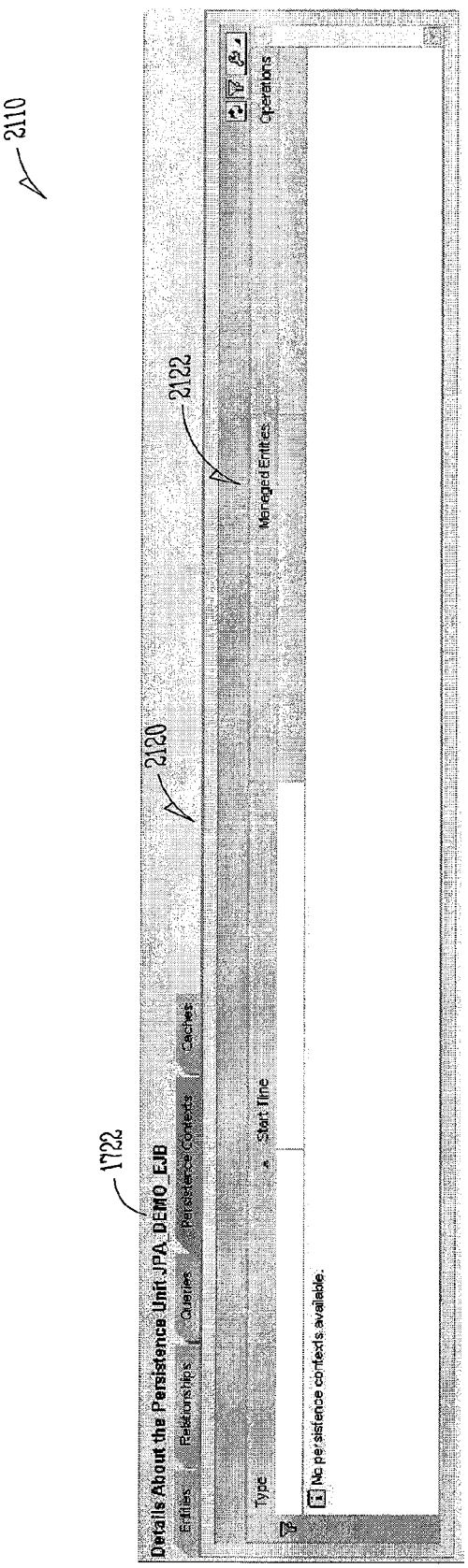

FIG. 21 illustrates an example user interface 2110 containing detailed information related to the Persistence Contexts of a selected Persistence Unit 1722. It can include a Persistence Context table 2120 that lists Persistence Contexts associated with the selected Persistence Unit 1722. The persistence contexts that are listed can be sorted according to certain criteria 2122, including, but not limited to, "Type," "Start Time," "Managed Entities," and "Operations."

Figure 22:
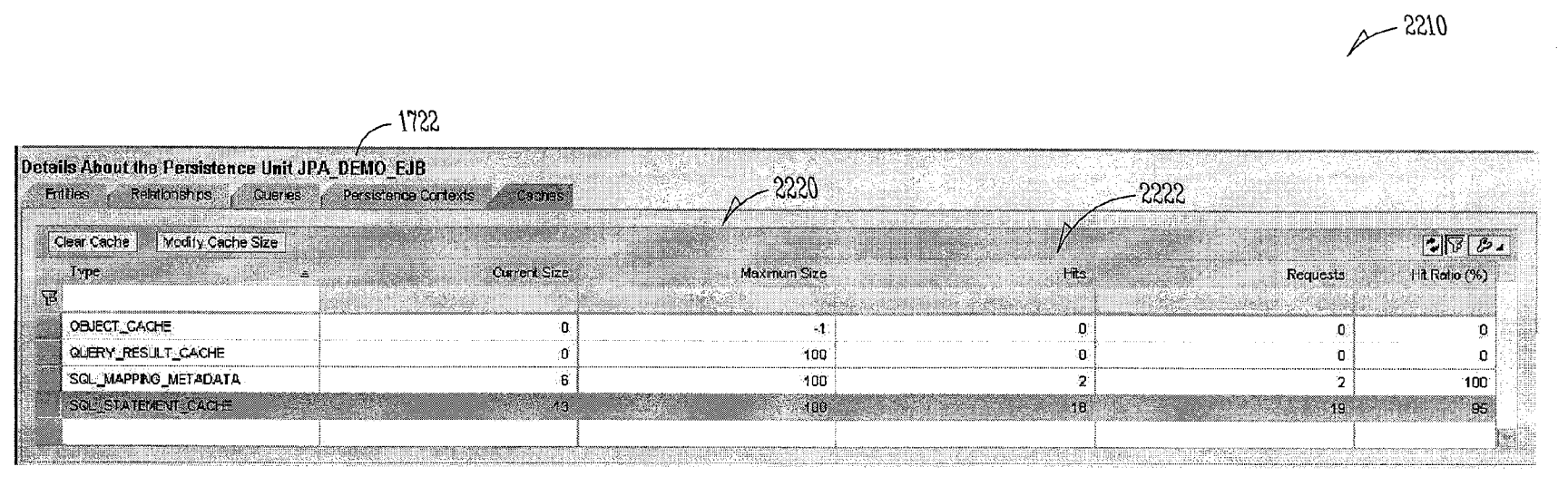

FIG. 22 illustrates an example user interface 2210 containing detailed information related to the Caches of a selected Persistence Unit 1722. It can include a cache table 2220 that lists caches associated with the selected Persistence Unit 1722. The caches listed can be sorted according to certain criteria 2222, including, but not limited to, "Type," "Current Size," "Maximum Size," "Hits," "Requests," and "Hit Ratio (%)."

Figure 23:
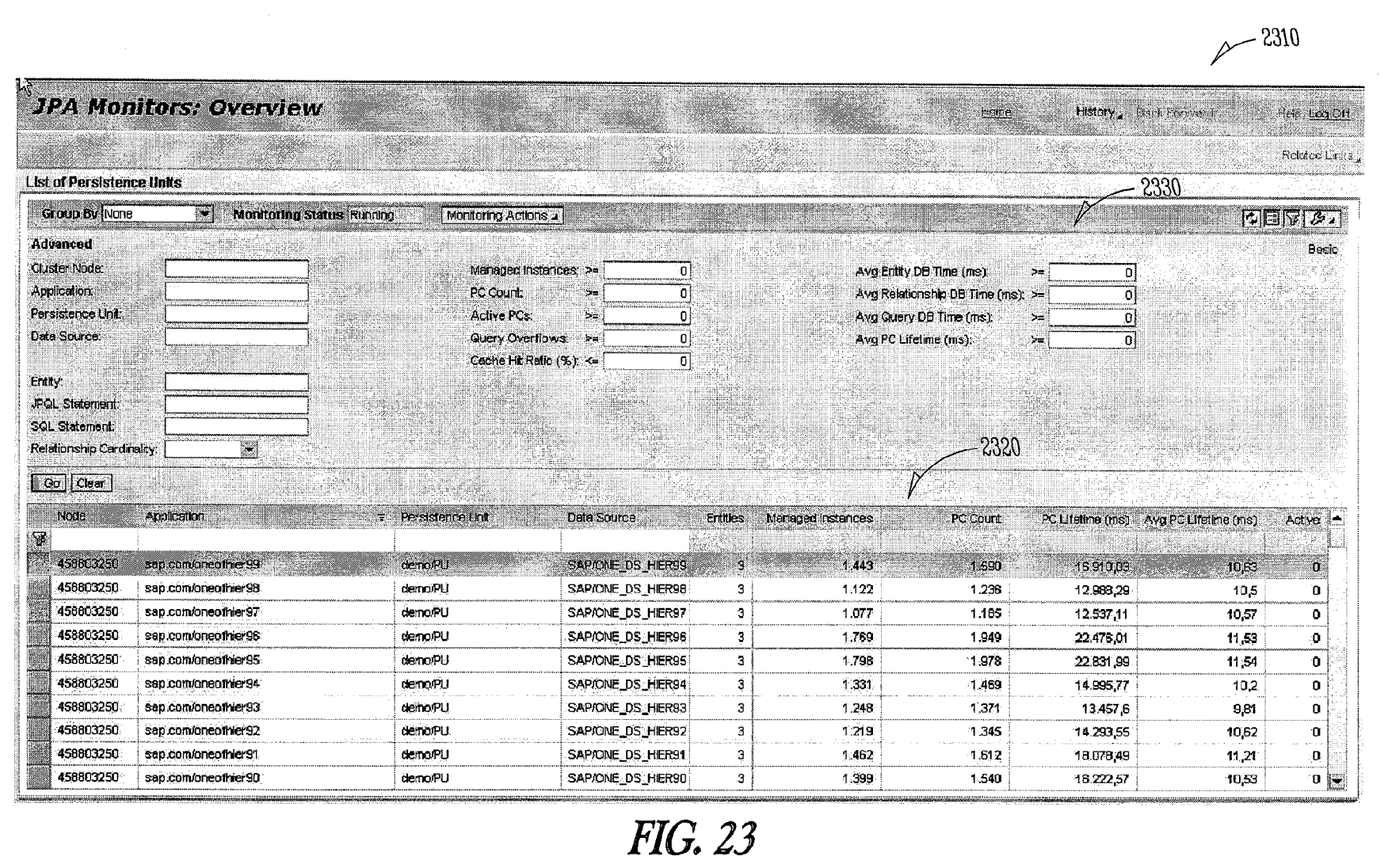

FIG. 23 illustrates an example search interface 2310. Similar to FIG. 17, FIG. 23 includes a listing of Persistence Units 2320. The search interface 2310 can include one or more user interface search boxes in a search criteria section 2330. These boxes can include, but are not limited to, one or a combination of "Cluster Node," "Application," "Persistence Unit," "Data Source," "Entity," "JPQL Statement," "SQL Statement," "Relationship Cardinality," "Managed Instances," "PC Count," "Active PCs," "Query Overflows," "Cache Hit Ratio (%)," "Avg. Entity DB Time," "Avg. Relationship DB Time." "Avg. Query DB Time," and "Avg. PC Lifetime."

Many of the disclosed embodiments have been described as being implemented using Java. However, as one skilled in the art will recognize, the present invention can be implemented using any programming language, object-oriented or otherwise, including, but not limited to, C++, C#, VB.NET, Python, PHP, Perl, and Ruby.

Figure 24:
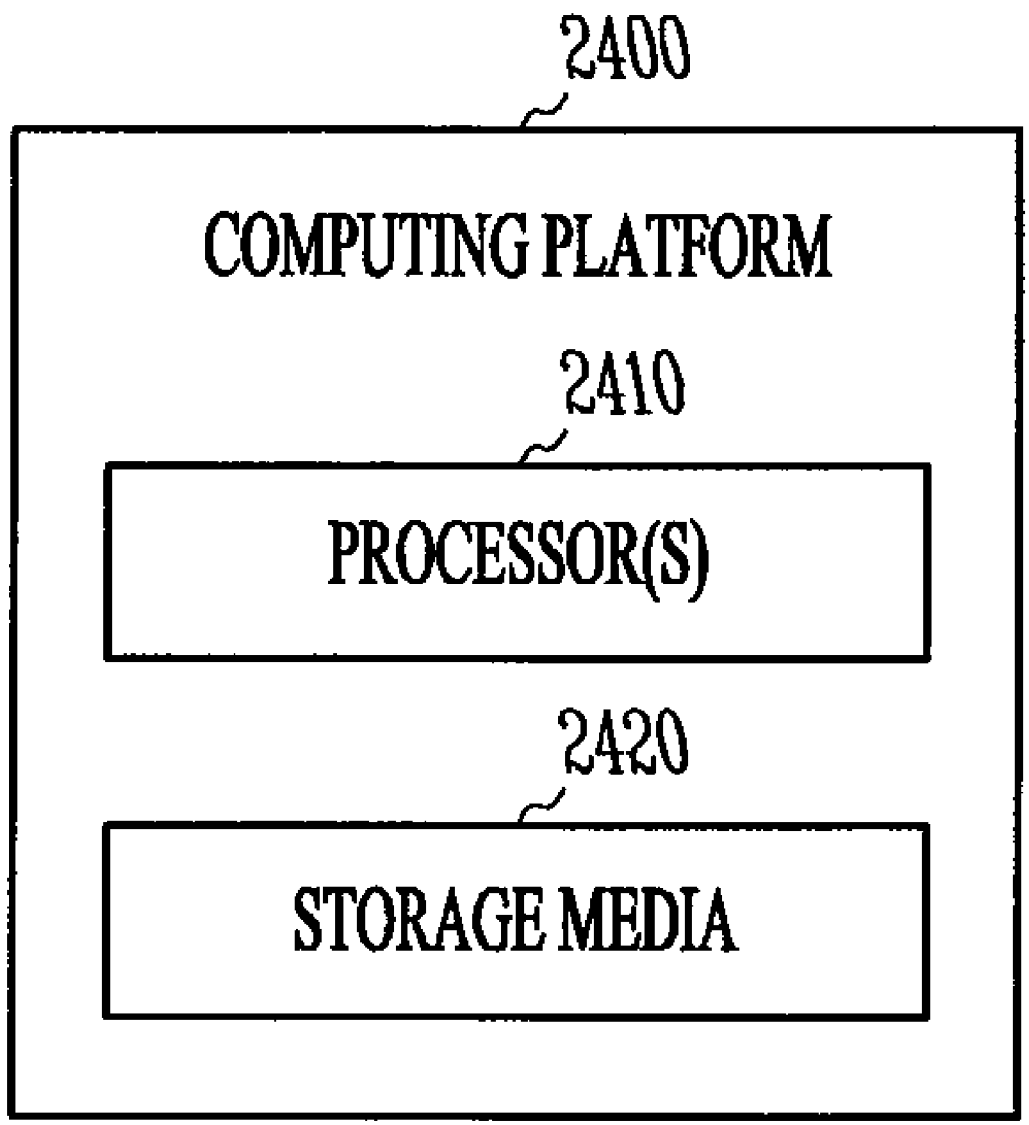
FIG. 24 illustrates a computing platform, according to one example embodiment of the inventive subject matter.

Referring now to FIG. 24 there is illustrated a computing platform 2400 that may host the monitoring infrastructure 100. According to one example embodiment, monitoring infrastructure 100 may be stored on one or more machine readable media 2420 on platform 2400, such as a hard drive or memory circuits, and execute on one or more processors 2410. Platform 2400 may take the form of one or more servers or other computing systems, such as workstations, personal computers, or mainframes.

Thus, other embodiments may be realized. For example, an article of manufacture, such as a computer, a memory system, a magnetic or optical disk, some other storage device, and/or any type of electronic device or system may include one or more processors coupled to a machine-readable medium such as a memory (e.g., removable storage media, as well as any memory including an electrical, optical, or electromagnetic conductor) having instructions stored thereon (e.g., computer program instructions), which when executed by the one or more processors result in performing any of the actions described with respect to the methods above.

The machine may take the form of a computer system having a processor coupled to a number of components directly, and/or using a bus. Such components may include main memory, static or non-volatile memory, and mass storage. Other components coupled to the processor may include an output device, such as a video display, an input device, such as a keyboard, a cursor control device, such as a mouse, and a signal generation device, such as a speaker. A network interface device to couple the processor and other components to a network may also be coupled to the bus. The instructions may further be transmitted or received over the network via the network interface device utilizing any one of a number of well-known transfer protocols (e.g., HTTP). Any of these elements coupled to the bus may be absent, present singly, or present in plural numbers, depending on the specific example to be realized.

The processor, the memories and the mass storage device may each include instructions which, when executed, cause the machine to perform any one or more of the methods described herein. In some examples, the machine operates as a standalone device or may be connected (e.g., networked) to other machines. In a networked environment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, the term "machine" shall also be taken to include any collection of machines that individually or jointly execute a set (or multiple sets) of instructions to perform any one or more of the methodologies discussed herein.

The term "machine-readable medium" should be taken to include a single medium or multiple media (e.g., a centralized or distributed database, and/or associated caches and servers, and or a variety of storage media, such as the processor, registers, memories, and the mass storage device) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include tangible media, such as solid-state memories and optical and magnetic media.

What is claimed is:

1. A monitoring system comprising:
   an application using an implementation of a Java Persistence Application Programming Interface (JPA) including at least one PersistenceUnit (PU) and at least one PersistenceContext (PC) associated with the PU;
   a first software layer of monitors, executed on at least one processor, to gather monitoring data from the PU and the associated PC;
   a second software layer executed on the at least one processor to collect monitoring data from the first software layer of monitors at a central point comprising a monitor service; and wherein the first and second software layers are contained within a JPA container and the JMX MBean is outside of the JPA container;
   a third layer, executed on the at least one processor, comprising a Java Management Extension (JMX) MBean to expose monitoring data collected at the central point; and
   wherein a monitored PC has a lifecycle beginning with a transaction (TX) begin event and ending with a TX commit event, a PC monitor for the PC is registered at the beginning of the lifecycle, and the data from the PC monitor is dumped and the PC monitor unregistered at the end of the lifecycle.

2. A system according to claim 1 further including a user interface communicating with the JMX MBean to expose the monitoring data to a user.

3. A system according to claim 2 further wherein the user interface is integrated in a further administrator and monitoring tool.

4. A system according to claim 3 wherein the Administrator and Monitoring tool includes navigation to database independent SQL monitoring, and the JMX MBean is reachable by the same navigation used to reach the database independent SQL Monitoring.

5. A system according to claim 1 wherein the monitoring data gathered by the PU and PC monitors includes static metadata about a given JPA application stored in the PU and volatile, dynamic data that represents an application's state regarding its object persistence stored in the PC.

6. A system according to claim 5 wherein the static metadata includes a list of entities per PU, persistence fields per entity, and a list of named queries.

7. A system according to claim 5 wherein the PU monitors aggregated data for database operations including create, read, update and delete (CRUD) operations on JPA entities, operations for relationship navigation, and Java Persistence Query Language (JPQL) and native queries.

8. A system according to claim 5 wherein the dynamic data is collected during runtime of an application and includes CRUD operations' execution time aggregated by managed entities and operation type, and execution time aggregated by query, lifetime of a PC, and number of managed entities at transaction end.

9. A system according to claim 1 further including an active PC data structure to hold data relating to active PCs that have an extended lifetime.

10. A system according to claim 1 wherein the monitors are Java classes that hold internal data structures with the monitored data.

11. A system according to claim 10 wherein the Java classes are accompanied by proxied versions of themselves, wherein the proxied versions execute calls to the monitors and delegate to target methods.

12. A system according to claim 1 wherein a static method is monitored using a slim object handed over to each monitored static method through an interface that offers methods to start and stop monitoring database operations.

13. A monitoring system comprising:
   one or more software components, executed on at least one processor, to collect monitoring data about an application in a run-time environment, the monitoring data including static data and dynamic data about the application;
   a user interface providing navigation to display monitoring information including or derived from the monitoring data, the monitoring information including:
      persistence units (PU);
      persistence contexts (PC);
      entities;
      relationships;
      named/dynamic queries; and
      caches
   wherein:
      the monitoring information about the PUs includes summary data about a number and lifetime of created PCs and an average number of entities per PC;
      the monitoring information about the PCs includes a start time, number of managed entities and creates, reads, updates and deletes (CRUDs);
      the monitoring information about the entities includes name, number of fields, number of CRUDs, and CRUD-time;
      the monitoring information about the relationships includes declaring and target entity, declaring field, cardinality, number of (DB) operations and operation time;
      the monitoring information about the named/dynamic queries includes text, Structured Query Language-text, number of executions and execution time; and the monitoring information about caches includes type of the cache, current and maximum size, number of hits and requests and hit ratio.

14. A monitoring system according to claim 13 further wherein the monitoring information is displayed in a hierarchy including current persistence units displayed in a PU view, and wherein the persistence contexts, entities, relationships, named/dynamic queries, and caches are displayed to show details of a PU selected from the PU view.

* * * * *